(12) United States Patent
Greenberg et al.

(10) Patent No.: US 12,093,868 B2
(45) Date of Patent: Sep. 17, 2024

(54) SYSTEMS AND METHODS OF GENERATING IMPROVED GRAPHICAL USER INTERFACES FOR DISTRIBUTED RULE AND WORKFLOW MANAGEMENT

(71) Applicant: Rapiscan Systems, Inc., Torrance, CA (US)

(72) Inventors: Joshua Greenberg, Los Altos, CA (US); Christopher Cook, Los Angeles, CA (US)

(*) Notice: Subject to any disclaimer, the term of this patent is extended or adjusted under 35 U.S.C. 154(b) by 0 days.

(21) Appl. No.: 17/172,717

(22) Filed: Feb. 10, 2021

(65) Prior Publication Data
US 2021/0248526 A1  Aug. 12, 2021

Related U.S. Application Data

(60) Provisional application No. 62/975,286, filed on Feb. 12, 2020.

(51) Int. Cl.
| | | |
|---|---|---|
| *G06Q 10/00* | (2023.01) | |
| *G06F 3/00* | (2006.01) | |
| *G06F 3/0482* | (2013.01) | |
| *G06F 16/00* | (2019.01) | |
| *G06F 16/28* | (2019.01) | |
| *G06Q 10/0631* | (2023.01) | |
| *G06Q 10/0633* | (2023.01) | |

(Continued)

(52) U.S. Cl.
CPC ....... *G06Q 10/0633* (2013.01); *G06F 3/0482* (2013.01); *G06F 16/287* (2019.01); *G06Q 10/06316* (2013.01); *G06Q 10/103* (2013.01); *H04L 51/046* (2013.01)

(58) Field of Classification Search
CPC ......... G06Q 10/00–50/00; G06F 16/00; G06F 3/00; H04L 51/00
USPC ................................................ 705/7.11–7.42
See application file for complete search history.

(56) References Cited

U.S. PATENT DOCUMENTS 7,738,899 B1 * 6/2010 Manroa ................. G06Q 10/10
455/412.2
9,990,111 B2    6/2018 Tan
(Continued)

FOREIGN PATENT DOCUMENTS

WO       2021163165 A1    8/2021

OTHER PUBLICATIONS

International Search Report for PCT/US21/17421, Apr. 27, 2021.
(Continued)

*Primary Examiner* — Mustafa Iqbal
(74) *Attorney, Agent, or Firm* — Novel IP

(57) ABSTRACT

The present specification discloses methods and systems for automatically processing an electronic data structure by receiving the electronic data structure that has categories associated therewith, determining, for a first subset of the categories, to automatically update a first set of states associated with the electronic data structure without routing the electronic data structure to a stakeholder, and determining, for a second subset of the categories, to route the electronic data structure to at least one stakeholder. After routing a portion of the electronic data structure to at least one stakeholder and receiving input from that stakeholder, a second set of states is updated based upon the received input and data is generated that is visually representative of each of the first set of states and second set of states.

6 Claims, 17 Drawing Sheets

(51) Int. Cl.
*G06Q 10/10* (2023.01)
*H04L 51/00* (2022.01)
*H04L 51/046* (2022.01)

(56) References Cited

U.S. PATENT DOCUMENTS

| | | | |
|---|---|---|---|
| 11,144,854 B1* | 10/2021 | Mouawad | G06Q 10/063114 |
| 11,361,268 B1* | 6/2022 | Fisher | G06Q 10/067 |
| 11,398,229 B1 | 7/2022 | Canzano | |
| 2005/0192831 A1 | 9/2005 | Ellison | |
| 2008/0228861 A1 | 9/2008 | Tadauchi | |
| 2010/0205539 A1* | 8/2010 | Gestsson | H04M 3/42365 715/752 |
| 2011/0179371 A1 | 7/2011 | Kopycinski | |
| 2011/0191217 A1 | 8/2011 | Saiu | |
| 2013/0054299 A1 | 2/2013 | Deshpande | |
| 2013/0152021 A1 | 6/2013 | Hatfield | |
| 2014/0129961 A1 | 5/2014 | Zubarev | |
| 2014/0337052 A1 | 11/2014 | Pellini | |
| 2014/0337071 A1* | 11/2014 | Stiffler | G06F 3/04847 705/7.13 |
| 2014/0358611 A1* | 12/2014 | Datta | G06Q 10/103 705/7.15 |
| 2016/0188769 A1* | 6/2016 | Aylott | G06Q 50/06 703/6 |
| 2018/0150650 A1 | 5/2018 | Saunders | |

OTHER PUBLICATIONS

Written Opinion of the International Searching Authority for PCT/US21/17421, Apr. 27, 2021.

FARclause Homepage titled "The Ultimate FAR Automation", downloaded on Nov. 9, 2022 from https://farclause.com/.

FARclause Library webpage, downloaded on Nov. 9, 2022 from https://farclause.com/FARregulation.

FARclause Addition webpage, downloaded on Nov. 9, 2022 from https://farclause.com/FARAddition.

FARclause Clause Comparison webpage, downloaded on Nov. 9, 2022 from https://farclause.com/ClauseComparison/ClauseComparison.

FARclause Clause Blog webpage, downloaded on Nov. 9, 2022 from https://farclause.com/ClauseBlog.

FARclause Forum Index webpage, downloaded on Nov. 9, 2022 from https://farclause.com/Forum/Index.

Farclause FAQ webpage, downloaded on Nov. 9, 2022 from https://farclause.com/FAQ.

Farclause Payment Plans webpage, downloaded on Nov. 9, 2022 from https://farclause.com/Payment.

Farclause Contact US webpage, downloaded on Nov. 9, 2022 from https://farclause.com/Contact.

"InDesign CS5 Automation Using XML and JavaScript"; Grant Gamble, 2001, Chapter 5: ScriptUI Dialogs, pp. 99-100; pages downloaded Nov. 16, 2022 from https://books.google.co.in/books?id=1aj1FofthiwC&printsec=frontcover&redir_esc=y#v=onepage&q&f=false.

Farclause homepage conveying features of "Instantly Extract clauses from RFP and Contracts" and "Analyze clauses for Applicability", downloaded on Nov. 11, 2022 from https://farclause.com/.

Just-clause.com features and functionalities, downloaded on Nov. 16, 2022 from https://archive.md/xNak4.

Farclause webpage to "Register an Account", downloaded on Nov. 16, 2022 from https://farclause.com/Account/Register.

* cited by examiner

200c —

CLAUSES ADDED RECENTLY (30 DAYS) — 210c

| Clause No | Regulation | Type | Flow Down | Status |
|---|---|---|---|---|
| 52.211-8 ridiculus mus Eget 1997 | ****** | | ut | vitae |

CLAUSES BY REGULATION AND TYPE

| Supplement Type | Total | Regulation | Type | Flow Down | Status |
|---|---|---|---|---|---|
| Cras dapibus | 90 | FAR | | 19 | 50 |
| Nullam | 350 | | | 84 | 183 |
| Tellus | 27 | | | 6 | 16 |
| Total | 475 | | 117 | 100 | 249 |

DEPARTMENTS

| Department | Manager | No of Users |
|---|---|---|
| Department 1 | Rick | 1 |
| Department 2 | Jacob | 9 |
| Department 3 | William | 2 |
| Department 4 | Mason | 2 |
| Department 5 | Alexa | 2 |
| Department 6 | Michael | 1 |
| Department 7 | Ethan | 2 |
| Department 8 | Alex | 1 |
| Department 9 | Aiden | 2 |
| Department 10 | Daniel | 1 |
| Department 11 | Anthony | 3 |
| Department 12 | Matthew | 2 |
| Department 13 | Emily | 1 |
| Department 14 | Joshua | 1 |
| Department 15 | Liam | 1 |
| Department 16 | Andrew | 1 |

| | | |
|---|---|---|
| DOCUMENT 7 (OCT 2010) | D1 | Aenean vulputate eleifend tellus.<br>• Cum sociis natoque penatibus et magnis dis parturient montes, nascetur ridiculus musquam felis commodo ligula | 76 |
| DOCUMENT 8 (JUL 2005) | D1 | Aenean vulputate eleifend tellus.<br>• Vivamus elementum semper nisi. Aenean vulputate eleifend tellus. Aenean leo ligula, porttitor eu, consequat tenenatis faucibus, tiam sit amet orci eget eros faucibus tincidunt sed fringilla eros vivamus elementum semper vivamus elementum semper nisi vulputate viverra nulla ut metus varius laoreet. Quisque rutrum imperdiet adfre viverra nulla ut metus varius laoreet usque rutrum. | 76 |
| DOCUMENT 9 (FEB 1997) | D1 | Aenean vulputate eleifend tellus.<br>• Lorem ipsum dolor sit amet, consectetuer adipiscing elit. Aenean commodo ligula ullamcorper ultricies nisi rhonr vitae sapien ut libero venenatis faucibus, tiam sit amet orci eget eros faucibus tincidunt urabitur | 62 |

SYSTEMS AND METHODS OF GENERATING IMPROVED GRAPHICAL USER INTERFACES FOR DISTRIBUTED RULE AND WORKFLOW MANAGEMENT

CROSS-REFERENCE

The present application relies on U.S. Patent Provisional Application No. 62/975,286, titled "Systems and Methods for Generating, Monitoring, and Distributing Workflows", and filed on Feb. 12, 2020, for priority, which is herein incorporated by reference in its entirety.

FIELD

The present specification generally relates to systems and methods for generating graphical user interfaces which enable improved management of operational rules and workflows across multiple organizational entities responsible for manufacturing a product or providing a service. More specifically, the present application is directed to graphical user interfaces to enable improved compliance with a plurality of rules and workflows across a plurality of departments in organizations.

BACKGROUND

When contracting with certain employers/clients, a manufacturing or service providing company may be required to abide by, conform to, or otherwise operate in accordance with certain workflows and rules. Exemplary rules may include, but are not limited to, rules specifying jurisdictions in which manufacturing must be done, rules regarding the materials that may be used during manufacturing, rules specifying if the materials must be sourced in a particular location, and rules specifying certain other requirements.

The process of effectively complying with such rules can become very complex when a company is dealing with data structures, each defined by multiple rules, wherein each rule in each data structure may have to be reviewed, approved or implemented by different individuals. For example, one rule may require different department heads within a company to agree or track internal data to comply with the rule. More specifically, if there is a particular manufacturing requirement, the head of logistics, the head of purchasing, and the head of manufacturing, may all need to agree to the rule. Tracking compliance with all the predefined rules in each data structure may become very complicated.

Currently, graphical user interfaces are not designed to effectively and concisely communicate critical information related to the specific workflows which are essential to operationally managing the conformance to rules specifying jurisdictions in which manufacturing must be done, rules regarding the materials that may be used during manufacturing, rules specifying if the materials must be sourced in a particular location, and rules specifying certain other requirements. Such information is often tracked on conventional spreadsheets, fail to communicate the real-time status of workflows, and fail to provide automated follow-ups on outstanding requests.

Hence, there is need for systems and methods that communicate data to individuals within organizations in a manner that improves their ability to ensure compliance with workflows, each defined by a plurality of rules, across several departments. There is also a need for graphical user interfaces that effectively and concisely communicate critical information related to the specific workflows, including data with respect to rules specifying jurisdictions in which manufacturing must be done, rules regarding the materials that may be used during manufacturing, rules specifying if the materials must be sourced in a particular location, rules specifying security requirements, rules specifying remedies in the event of a non-conforming or non-compliant deliverable, and/or rules specifying certain other requirements. There is also a need for graphical user interfaces that communicate the real-time status of workflows and provide automated follow-ups on outstanding requests.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses a method for selectively routing data through an electronic network, comprising receiving, in a server, the electronic data structure, wherein the electronic data structure associates a plurality of data with a plurality of different categories; using the server, accessing the plurality of different categories from a memory, wherein the plurality of different categories is stored in the memory in association with each of a plurality of stakeholders and wherein each of the plurality of stakeholders is stored in the memory in association with one or more electronically addressable locations; using the server, determining, for a first subset of the plurality of different categories, to automatically update a first set of states associated with the electronic data structure without routing the electronic data structure to at least one of the plurality of stakeholders using the one or more electronically addressable locations; using the server, determining, for a second subset of the plurality of different categories, to route the electronic data structure to at least one of the plurality of stakeholders using the one or more electronically addressable locations; using the server, routing at least a portion of the electronic data structure to at least one of the plurality of stakeholders using the one or more electronically addressable locations; using the server, receiving input from the at least one of the plurality of stakeholders; using the server, updating a second set of states based upon the received input; and using the server, generating data that is visually representative of each of the first set of states and second set of states.

Optionally, the method further comprises receiving, in a client device, the visually representative data and displaying the visually representative data such that each of the first set of states and second set of states is visually associated with the electronic data structure.

Optionally, the one or more electronically addressable locations comprise an email address, a hardware address, and/or a mobile phone number.

Optionally, the method further comprises using the server to generate data representative of a graphical user interface wherein the graphical user interface is configured to prompt a user to associate at least one of the plurality of different categories with at least one of the plurality of stakeholders.

Optionally, the method further comprises using the server to generate data representative of a graphical user interface wherein the graphical user interface is configured to display, in a first region, data indicative of at least one of the plurality of categories and, in a second region, data indicative of at least one of the first states or the second states.

Optionally, data indicative of at least one of the plurality of categories comprise a hyperlink, which, when activated causes another graphical user interface to be generated for displaying details related to the at least one of the plurality of categories.

Optionally, at least one of the first set of states is indicative of at least one of the first subset of the plurality of categories being approved.

Optionally, at least one of the second set of states is indicative of at least one of the second subset of the plurality of categories not being approved.

Optionally, the at least one of the first set of states indicative of being approved is visually distinct from the at least one of the second set of states not being approved.

Optionally, after routing and before receiving input, the method further comprises using the server to send one or more notifications to the at least one of the plurality of stakeholders at the one or more electronically addressable locations.

In some embodiments, the present specification is directed toward a system for selectively routing data through an electronic network, wherein the system comprises at least one processor, a first non-transient memory, and a plurality of programmatic instructions stored in the first non-transient memory and wherein, when the plurality of programmatic instructions are executed by the at least one processor, they cause a server to: receive the electronic data structure, wherein the electronic data structure associates a plurality of data with a plurality of different categories; access the plurality of different categories from a second non-transient memory, wherein the plurality of different categories is stored in the second non-transient memory in association with each of a plurality of stakeholders and wherein each of the plurality of stakeholders is stored in the second non-transient memory in association with one or more electronically addressable locations; determine, for a first subset of the plurality of different categories, to automatically update a first set of states associated with the electronic data structure without routing the electronic data structure to at least one of the plurality of stakeholders using the one or more electronically addressable locations; determine, for a second subset of the plurality of different categories, to route the electronic data structure to at least one of the plurality of stakeholders using the one or more electronically addressable locations; route at least a portion of the electronic data structure to the at least one of the plurality of stakeholders using the one or more electronically addressable locations; receive input from the at least one of the plurality of stakeholders; update a second set of states based upon the received input; and generate data that is visually representative of each of the first set of states and second set of states.

Optionally, the data that is visually representative of each of the first set of states and second set of states are visually associated with the electronic data structure.

Optionally, the one or more electronically addressable locations comprise an email address, a hardware address, and/or a mobile phone number.

Optionally, the plurality of programmatic instructions, when executed by the at least one processor, is further configured to generate data representative of a graphical user interface wherein the graphical user interface is configured to prompt a user to associate at least one of the plurality of different categories with at least one of the plurality of stakeholders.

Optionally, the plurality of programmatic instructions, when executed by the at least one processor, is further configured to generate data representative of a graphical user interface wherein the graphical user interface is configured to display, in a first region, data indicative of at least one of the plurality of categories and, in a second region, data indicative of at least one of the first states or the second states.

Optionally, data indicative of at least one of the plurality of categories comprise a hyperlink, which, when activated causes another graphical user interface to be generated for displaying details related to the at least one of the plurality of categories.

Optionally, at least one of the first set of states is indicative of at least one of the first subset of the plurality of categories being approved.

Optionally, at least one of the second set of states is indicative of at least one of the second subset of the plurality of categories not being approved.

Optionally, the at least one of the first set of states indicative of being approved is visually distinct from the at least one of the second set of states not being approved.

Optionally, the plurality of programmatic instructions, when executed by the at least one processor, is further configured to send one or more notifications to the at least one of the plurality of stakeholders at the one or more electronically addressable locations after routing and before receiving the input.

In some embodiments, the present specification discloses a graphical user interface (GUI) configured to display first data, second data, and third data in a visual grid having a plurality of rows and columns, said GUI being generated by a workflow management module implemented on at least one server and rendered for display on at least one client device remote from and in data communication with said at least one server, the GUI comprising: a first column to display said first data indicative of one or more rules, each of said one or more rules being displayed in a corresponding row of said plurality of rows; a second column to display said second data indicative of first, second or third state associated with each of the one or more rules; and a third plurality of columns, each of said third plurality of columns being associated with a department and displaying said third data, wherein said third data is indicative of a first status, a second status, or a third status of an implementation of a rule assigned to a department, wherein said third data is displayed in a cell defined by an intersection of a row associated with a rule of said one or more rules and a column of said third plurality of columns, and wherein said third data is visually aligned, horizontally, with said rule in said row.

Optionally, each of said one or more rules is represented via a hyperlink, which, when activated causes another GUI to be generated for displaying details related to the rule.

Optionally, the first state is indicative of a rule being approved, the second state is indicative of a rule not being approved and the third state is indicative of a rule requiring analyses to decide between full approval, partial approval, or no approval.

Optionally, the first state is communicated using a first visual icon, the second state is communicated using a second visual icon, and the third state is communicated using a third visual icon, and wherein the first, second and third visual icons are characterized by different shapes, sizes, colors, textures, orientations, blink rates, and/or imagery.

Optionally, the first status is indicative that a rule has been implemented, the second status is indicative that a rule has not been implemented and no progress has been made on its implementation, and the third status is indicative that implementation of a rule is in-progress.

Optionally, the GUI further comprises a first field for enabling said first data, said second data, and said third data in the visual grid to be filtered based on a first criterion, said first criterion pertaining to a regulation to which a rule may be related to; a second field to enable said first data, said second data and said third data in the visual grid to be filtered based on a second criterion, said second criterion pertaining to said first status, said second status, or said third status; a third field to enable said first data, said second data, and said third data in the visual grid to be filtered based on a third criterion, said third criterion pertaining to a department to which a rule is assigned; and a fourth field to enable searching of said first data, said second data, and said third data in the visual grid based on said first data.

In some embodiments, the present specification discloses a graphical user interface (GUI) configured to enable a reviewer to generate a report associated with first data, second data, and third data displayed in a visual grid having a plurality of rows and columns, said GUI being generated by a workflow management module implemented on at least one server and rendered for display on the reviewer's client device remote from and in data communication with said at least one server, the GUI comprising: a first field to enable the reviewer to input a title of said report; a second field pre-populated with a name of the reviewer; a third field pre-populated with a date of generation of said report, wherein said second field and said third field cannot be modified by the reviewer; a fourth field to enable said first data, said second data, and said third data to be filtered based on a first criterion, said first criterion pertaining to a regulation to which said first data may be related to; and a fifth field to enable said first data, said second data, and said third data to be searched based on said first data, wherein said visual grid comprises: a first column to display said first data indicative of one or more rules, each of said one or more rules being displayed in a corresponding row of said plurality of rows; a second column to display said second data indicative of a first state, a second state, or a third state associated with each of the one or more rules; and a third plurality of columns, each of said third plurality of columns being associated with a department and displaying said third data indicative of a first status, a second status, or a third status of implementation of a rule assigned to the department, wherein said third data is displayed in a cell defined by an intersection of a row associated with a rule of said one or more rules and a column of said third plurality of columns, and wherein said third data is visually aligned, horizontally, with said rule in said row.

Optionally, each of said one or more rules is represented via a hyperlink, which when activated causes another GUI to be generated for displaying details related to the rule.

Optionally, the first state is indicative of a rule being approved, the second state is indicative of a rule being not approved, and the third state is indicative of a rule requiring analyses to decide full, partial or no approval.

Optionally, the first state is communicated using a first visual icon, the second state is communicated using a second visual icon and the third state is communicated using a third visual icon, and wherein the first visual icon, the second visual icon, and the third visual icon are characterized by different shapes, sizes, colors, textures, orientations, blink rates, and/or imagery.

Optionally, the first status is indicative that a rule has been implemented, the second status is indicative that a rule has not been implemented and no progress has been made on its implementation, and the third status is indicative that implementation of a rule is in-progress.

Optionally, the reviewer is a third-party authorized to review implementation status of said one or more rules at a predefined frequency.

In some embodiments, the present specification discloses a first graphical user interface (GUI) configured to display a plurality of data, said first GUI generated by a workflow management module in response to a user activating a first visual icon on a second GUI, wherein the workflow management module is implemented on at least one server, and wherein said first GUI and said second GUI are rendered for display on at least one client device remote from and in data communication with said at least one server, the first GUI comprising: a first region displaying a first field for enabling said plurality of data to be filtered based on a regulation associated with a rule, a second field to enable said plurality of data to be filtered based on a first state, a second state or a third state of a rule, and a third field to enable said plurality of data to be searched based on a rule; and a second region displaying said plurality of data in a visual grid having a plurality of rows and columns, said visual grid comprising: a first column to display first data, of said plurality of data, indicative of identification and version dates associated with each of a plurality of rules; a second column to display second data, of said plurality of data, indicative of said plurality of rules, each of said plurality of rules being displayed in a corresponding row of said plurality of rows; and a third column to display third data indicative of an action, each of said third data being associated with and visually horizontally aligned with each of said first and second data in a row of said plurality of rows.

Optionally, the first state is indicative of a rule being approved, the second state is indicative of a rule being not approved and the third state is indicative of a rule requiring analyses to decide full, partial or no approval.

Optionally, said plurality of data is organized in a data structure in at least one database accessible to said workflow management module.

Optionally, said third data is configured as a second visual icon, and wherein actuating said second visual icon corresponds to said action being implemented.

Optionally, implementation of said action causes first and second data associated with said third data to be imported into said second GUI.

Optionally, clicking on said first data causes an information box to be displayed within said first GUI, said information box displaying details related to said second data visually aligned with said first data.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein:

FIG. 2C shows an exemplary GUI to enable an administrator to view summarized data related to a plurality of rules, in accordance with some embodiments of the present specification;

FIG. 2D shows an exemplary GUI to enable an administrator to view rules along with state and implementation status corresponding to each of the rules across various departments, in accordance with some embodiments of the present specification;

DETAILED DESCRIPTION

Figure 1:
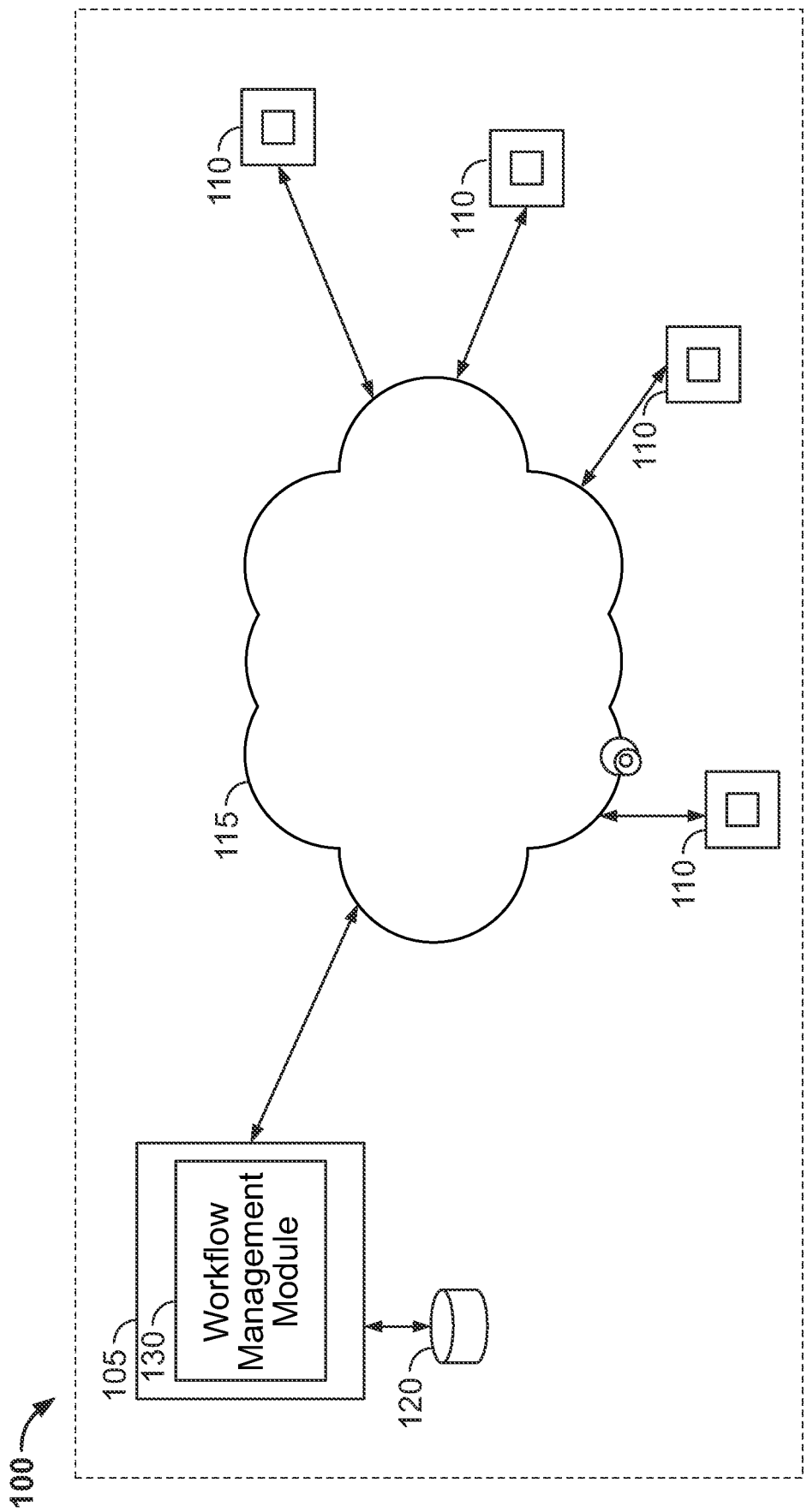
FIG. 1 illustrates a system in which a plurality of improved GUIs (Graphical User Interfaces), for distributed rules and workflow management in an organization, are generated and displayed, in accordance with some embodiments of the present specification.

In accordance with some aspects, the present specification provides methods, and associated graphical user interfaces, that enable individuals within an organization to assign or allocate each of a plurality of rules to at least one organizational entity. In embodiments, the methods, and associated graphical user interfaces, enable each of the individuals within the organizational entity to be notified, via one or more reminders, of the assigned rules and enables the assigned organizational entity to input/record progress notes against the assigned rules. In some embodiments, completion of a rule may entail associating predefined data, indicative of a compliance certificate, with the rule. In embodiments, the methods, and associated graphical user interfaces, automatically enable a triggering of re-certification of rules on a periodic basis.

In an embodiment the present specification provides a method of ensuring that processes, executed by or within a business to manufacture or supply a product or to provide a service, are in conformance with one or more predefined sets of rules.

In an embodiment, the present specification provides a method for enabling a business administrator to maintain a database of predefined sets of rules that may be applied for manufacturing a product or providing a service. In various embodiments, maintaining the database comprises ensuring that said rules are updated with respect to a rule issuing authority.

In an embodiment, the present specification provides a method for enabling a rule approver to determine if the stored rules may be applied for manufacturing a product or providing a service. In an embodiment, the present specification provides a method for enabling a rule implementer to ensure that the stored rules are applied for manufacturing a product or providing a service. In an embodiment, the present specification provides a method for enabling a rule auditor to ensure that the stored rules have been applied for manufacturing a product or providing a service.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hardwired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming or controlling a general purpose processor. Stated differently, in some embodiments, a module, application or engine implements a plurality of instructions or programmatic code to cause a general purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

In embodiments, the term "stakeholder" is used to refer to a human, a group of humans, an organization, or an entity with a particular interest or concern.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

Overview

FIG. 1 illustrates an embodiment of a system/environment 100 in which a plurality of improved GUIs (Graphical User Interfaces), for distributed rules and workflow management in an organization, are implemented or executed. The system 100 comprises client-server architecture, where one or more servers 105 are in communication with one or more client devices 110 over a network 115 such as, for example, an Intranet or the Internet. Users (who may or may not be members of the organization), with predefined roles or user-profiles, access privileges and permission rights, may access the system 100 via the one or more client devices 110.

The client devices 110 comprise computing devices such as, but not limited to, personal or desktop computers, laptops, Netbooks, handheld devices such as smartphones, tablets, and PDAs, and/or any other computing platform known to persons of ordinary skill in the art. Although four client devices 110 are illustrated in FIG. 1, any number of client devices 110 can be in communication with the one or more servers 105 over the network 115.

The one or more servers 105 can be any computing device having one or more processors and one or more computer-readable storage media such as RAM, hard disk or any other optical or magnetic media. The one or more servers 105 include at least one engine or module operating to provide or implement the plurality of improved GUIs along with the workflows of the present specification. In some embodiments, the one or more servers 105 may be implemented by a serverless or a cloud of computing platforms operating together as servers 105.

In some embodiments, the one or more servers 105 include or are in communication with at least one database system 120. The database system 120 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database system 120 may comprise one or more such databases that reside in one or more physical devices and in one or more physical locations.

In embodiments, the at least one database system 120 stores and updates a plurality of data and data associations or inter-relations that are organized using one or more data structures, schemas or tables.

In accordance with aspects of the present specification, the one or more servers 105 provide or implement a rules and workflow management engine or module 130. In embodiments, the rules and workflow management module 130 executes a plurality of programmatic instructions or code to a) generate a plurality of improved GUIs of the present specification, b) provide access to the plurality of improved GUIs, populated with relevant data, to authorized users via the one or more client devices 110, and c) implement one or more workflows that utilize the plurality of improved GUIs to ensure that various business processes, in the organization, directed towards manufacturing or supplying a product and/or providing a service follow or are in conformance with one or more sets of rules.

In some embodiments, the one or more servers 105 also implement a web server in data communication with the rules and workflow management module 130. In such embodiments, the web server is configured to host a rules and workflow management website that provides the plurality of improved GUIs for interactive access using a browser application in each of the one or more client devices 110. Alternatively, in some embodiments, each of the one or more client devices 110 is configured to implement or execute a client-side module that operates as a workflow management application. The client-side module is configured to render one or more of the plurality of improved GUIs based on the predefined role, access privilege and profile of a user using the client-side module.

In accordance with some aspects of the present specification, the rules and workflow management module 130 differentiates users of the system 100 or stakeholders into at least first, second, third and fourth user-profiles, each having predefined roles, access privileges to one or more of the plurality of GUIs and permission rights to view, add and/or delete various data using one or more of the plurality of GUIs, as follows:

At least one first user-profile (hereinafter referred to as an administrator) has access to organization-wide data and GUIs, but is primarily responsible for making sure that the at least one database 120 stores a plurality of rules (related or applicable to the business processed of the organization) and keeps them up to date. In some embodiments, the administrator is also responsible for associating each of the plurality of rules with additional data indicative of, for example, department, employee designation, employee name, rule state (first, second or third), regulation, user-profile (of the employee) and reminder type and frequency. In some embodiments, the administrator assigns one or more of the plurality of rules to one or more relevant parts of the organization such as, for example, departments, committees or functional groups.

In some embodiments, for each of the first, second, third and fourth user-profiles (stakeholders), the administrator is responsible for storing and maintaining (in the at least one database 120) predefined roles, access privileges to one or more of the plurality of GUIs and permission rights to view, add and/or delete various data using one or more of the plurality of GUIs.

At least one second user-profile (hereinafter referred to as an approver), an approver, is typically a head of a part of the organization. The approver is responsible for approving whether the organization can abide by each of the one or more rules that have been assigned to his part of the organization (department, for example). In some embodiments, the approver has access to data and GUIs pertaining to his part of the organization. In some embodiments, the approver has access to organization-wide data and GUIs.

At least one third user-profile (hereinafter referred to as an implementer), an implementer, is typically a manager of a part of the organization. The implementer is responsible for ensuring that his part of the organization (department, for example) actually abides by each of the one or more assigned rules.

At least one fourth user-profile (hereinafter referred to as a reviewer or analyzer), a reviewer, is either an employee of the organization or an external third party responsible for checking whether the organization has abided by each of the one or more rules assigned to various parts of the organization.

Graphical User Interfaces (GUIs)

In embodiments, the administrator uses his client device 110 to log into the at least one server 105 using his credentials (such as, login ID and password). Consequently, the rules and workflow management engine or module 130 presents the administrator with one or more function options in a browser application or a client-side module of his client device 110.

Figure 2A:
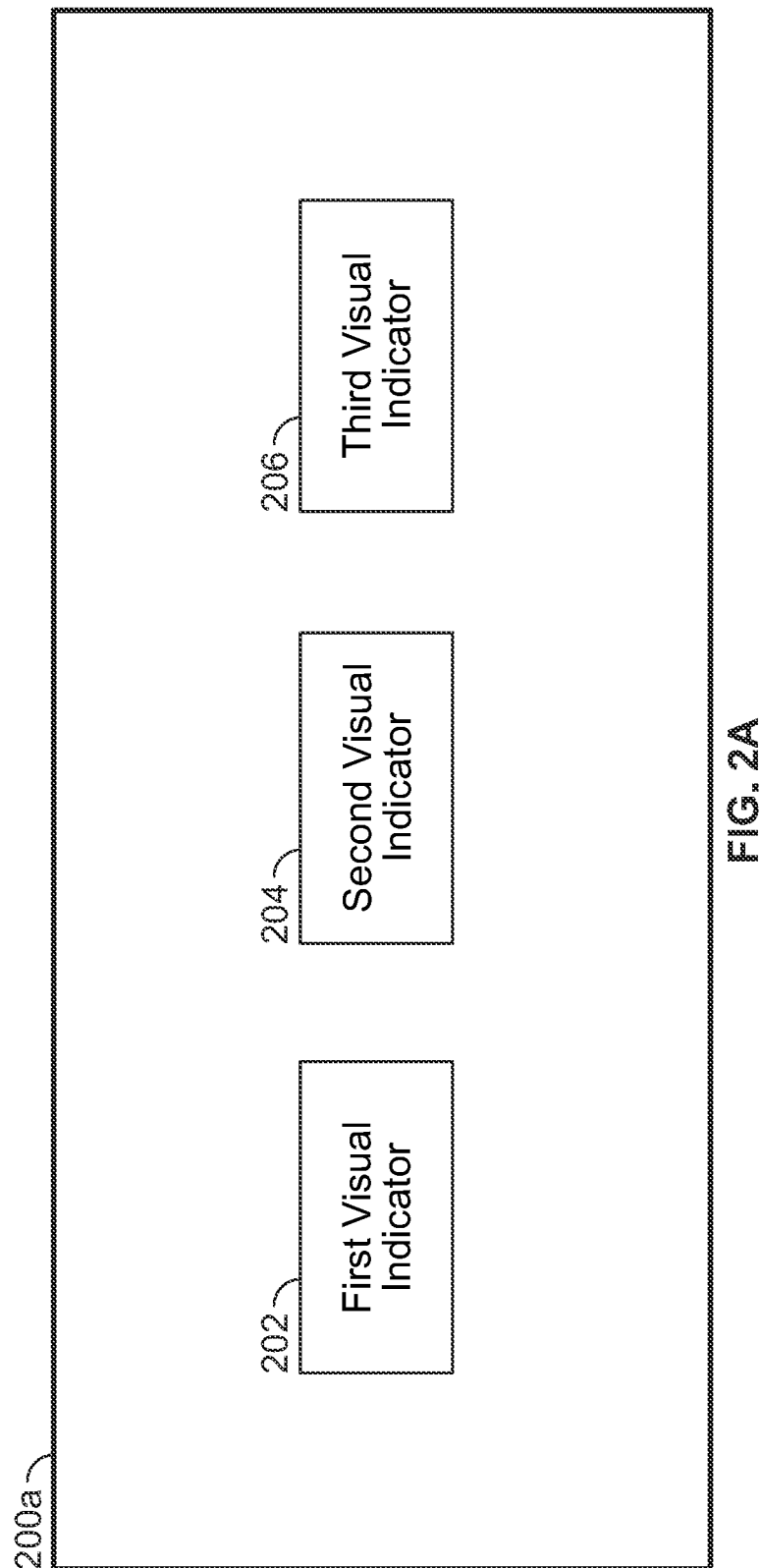
FIG. 2A shows an exemplary GUI to enable an administrator to access first, second and third GUIs to input and view a plurality of data, in accordance with some embodiments of the present specification.

As shown in FIG. 2A, in some embodiments, the administrator is presented with a GUI 200a displaying a first visual indicator 202, a second visual indicator 204 and a third visual indicator 206. The first visual indicator 202 when actuated (such as, for example, by clicking using a mouse or by providing a touch based input if the display screen of the administrator's client device 110 is touch enabled) by the administrator causes the rules and workflow management module 130 to generate a GUI 200b of FIG. 2B for displaying in the administrator's client device and enabling the administrator to input and store a plurality of rules and additional data. In some embodiments, the GUI 200b is pre-populated with one or more data that is accessed by the module 130 from the at least one database 120.

The second visual indicator 204 when actuated by the administrator causes the rules and workflow management module 130 to generate a GUI 200c of FIG. 2C for displaying in the administrator's client device and enabling the administrator to view summarized data related to the plurality of rules. In some embodiments, the GUI 200c is pre-populated with one or more data that is accessed by the module 130 from the at least one database 120.

The third visual indicator 206 when actuated by the administrator causes the rules and workflow management module 130 to generate a GUI 200d of FIG. 2D for displaying in the administrator's client device and enabling the administrator to view a plurality of rules, associated with at least one data structures, such as a contract, along with a state and implementation status corresponding to each of the plurality of rules across various departments. In some embodiments, the GUI 200d is pre-populated with one or more data that is accessed by the module 130 from the at least one database 120.

In some embodiments, the GUI 200d is accessible to other user-profiles as well such as the approvers, implementers and/or a reviewer.

GUI 200b

Figure 2B:
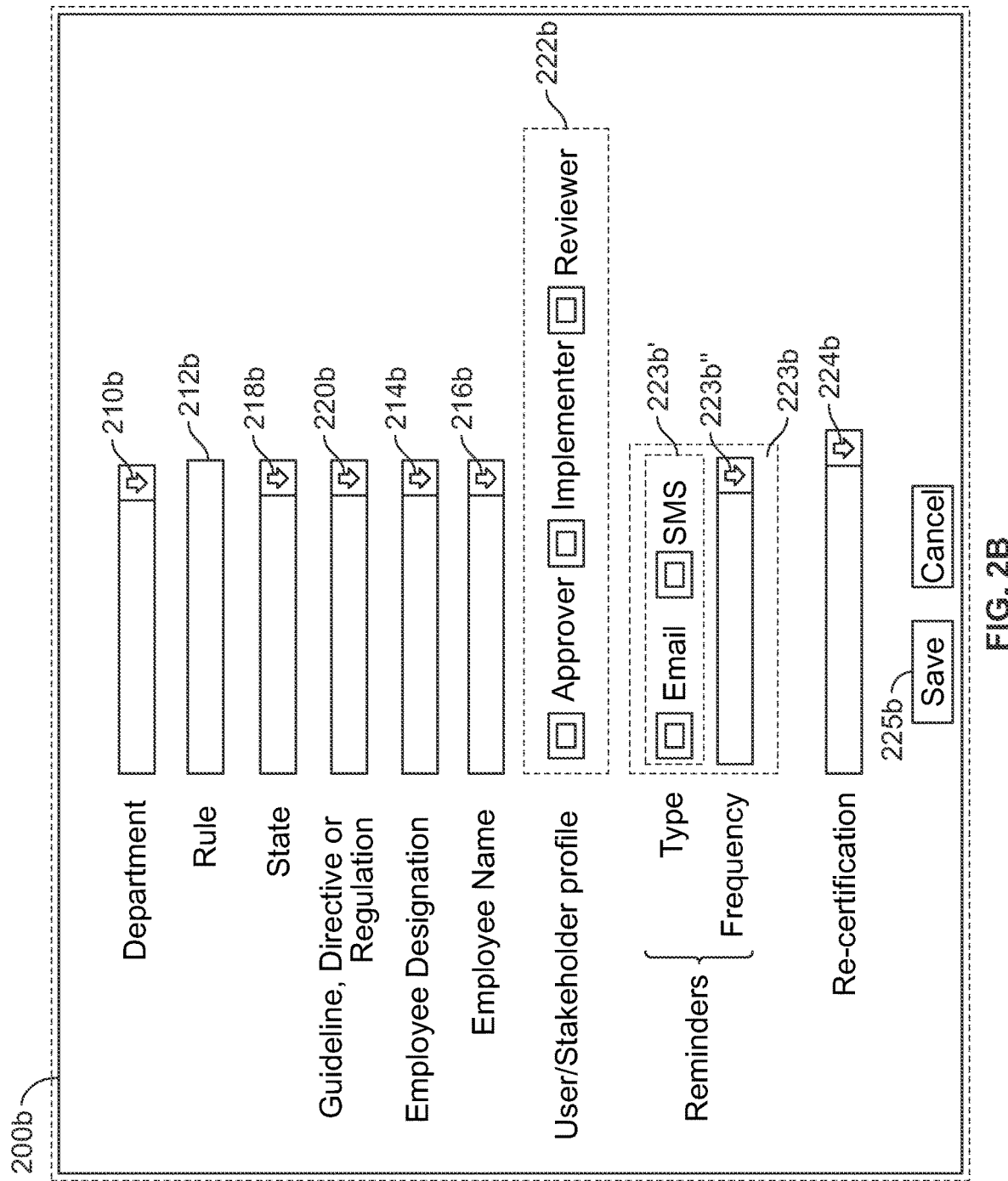
FIG. 2B shows an exemplary GUI to enable an administrator to input rules and related data, in accordance with some embodiments of the present specification.
Figure 2D:
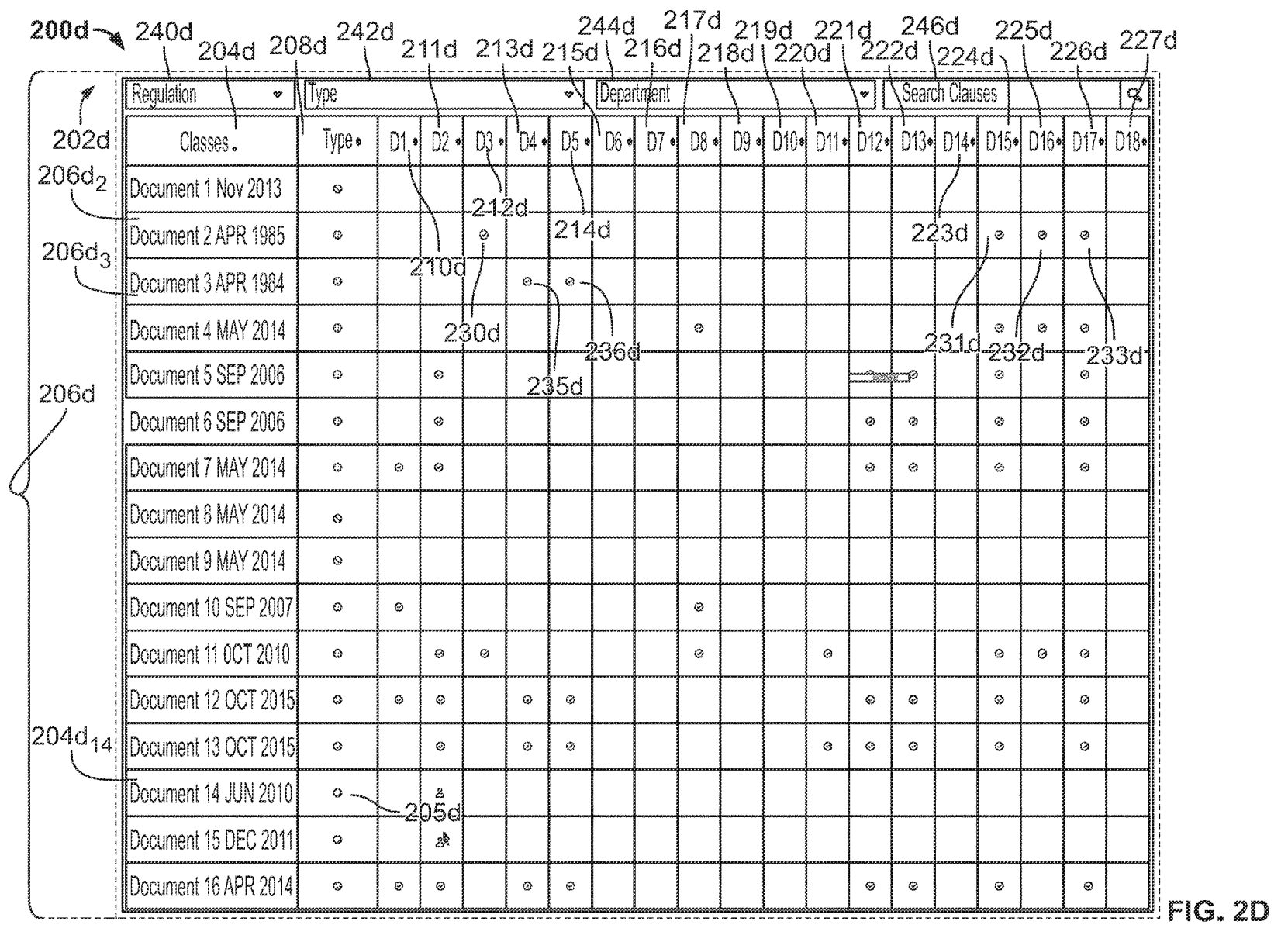

Referring now to FIG. 2B, the GUI 200b presents a first field 210b that allows the administrator to specify a part of an organizational such as, for example, a department (committee, or functional group) to which a rule may be assigned. In some embodiments, the first field 210b is configured as a drop down list of pre-populated organizational departments (committees, or functional groups) that the administrator may select from. For example, the drop down list may include departments such as, but not limited to, manufacturing, hiring, contracts, finance, human resources (HR), law, legal affairs, operations, purchasing, quality assurance (QA), sales, services and travel. A second field 212b allows the administrator to input a rule associated with or assigned to the department selected in the first field 210b. In some embodiments, the second field 212b is configured as a text box. For example, if the administrator selects the department as 'manufacturing' (in the first field 210b) then he may input 'acceptable locations of manufacturing' or 'acceptable materials' as the rule (in the second field 212b).

A third field 214b allows the administrator to specify an employee function, designation or role based on the department selected in the first field 210b. In some embodiments, the third field 214b is configured as a drop down list of pre-populated employee functions, designations or roles. For example, if the administrator selects the department as 'HR' (in the first field 210b) then the third field 214b may automatically show Head of HR, Head of Training and Development, HR Manager, Training and Development Manager and Compensation and Benefits Manager in the drop down list.

A fourth field 216b allows the administrator to specify an employee name based on the employee function, designation or role selected in the third field 214b. In some embodiments, the fourth field 216b is configured as a drop down list of pre-populated executives/managers related to the employee function, designation or role selected in the third field 214b. For example, if the administrator selects the employee function, designation or role as HR manager (in the third field 214b), the fourth field 216b may automatically show various HR manager names to select from. A fifth field 218b allows the administrator to specify one of a first, second or third state of the rule input in the second field 212b. In some embodiments, the fifth field 218b is configured as a drop down list of pre-populated first, second and third states to choose from. In some embodiments, the first state corresponds to a rule being approved, accepted or implemented, the second state corresponds to a rule being denied—that is, not approved, accepted or implemented and the third state corresponds to a rule requiring analyses to decide full, partial or no approval, acceptance or implementation of the rule. In some embodiments, the first, second and third states are described using textual data. In some embodiments, the first, second and third states are communicated using visual icons such as, for example, a green colored dot indicative of the first state, a red colored dot being indicative of the second state and a yellow colored dot being indicative of the third state. In various embodiments, the visual icons could be of different shapes, sizes, colors, textures, orientations, blink rates, imagery (inanimate or animate) and/or other visual traits.

It should be appreciated that the number of fields, in the GUI 200b, may vary in different embodiments. For example, in some embodiments, the GUI 200b may further include a sixth field 220b that allows the administrator to specify a guideline, directive or regulation on which the rule in the second field 212b relates to. In some embodiments, the sixth field 220b is configured as a drop down list of pre-populated regulations. For example, the rule may be related to a guideline, directive or regulation such as, but not limited to, Corporate Governance, HSAR (Homeland Security Acquisition Regulation), Corporate Social Responsibility, DFARS (Defense Federal Acquisition Regulation Supplement), Work Ethics, FAR (Federal Acquisition Regulation), and Team Culture.

In some embodiments, the GUI 200b further includes a seventh field 222b that allows the administrator to specify a user-profile—that is, whether the employee specified in the fourth field 216b is designated or authorized as an approver, implementer or reviewer of the rule (input in the second field 212b). In some embodiments, the seventh field 222b is configured as a group of first, second and third check-boxes such that checking the first check-box indicates that the employee is authorized as an approver, checking the second check-box indicates that the employee is authorized as an implementer and checking the third check-box indicates that the employee is authorized as a reviewer. In some embodiments, checking both the first and second check-boxes indicates that the employee is authorized both as an approver and an implementer. However, in some embodiments, an employee who is designated as an approver, implementer or both may not be also designated as a reviewer. Accordingly, if the first and/or second check-boxes are checked, the GUI 200b is configured to automatically disable the third check-box. Similarly, in some embodiments, an employee who is designated as a reviewer may not be also designated as an approver and/or an implementer. Accordingly, if the third check-box is checked, the GUI 200b is configured to automatically disable the first and second check-boxes. Stated differently, in some embodiments, it is preferred that a reviewer is not the same person who is tasked with the roles and responsibilities of an approver and/or implementer.

As discussed earlier in the specification, the administrator is responsible for storing and maintaining (in the at least one database 120) predefined roles, access privileges to one or more of the plurality of GUIs and permission rights to view, add and/or delete various data using one or more of the plurality of GUIs. Accordingly, when the administrator designates an employee as approver or implementer, approver and implementer, or reviewer the module 130 automatically accesses the corresponding predefined role, access privileges and permission rights from the at least one database 120 and assigns them to the employee.

In some embodiments, the GUI 200b further includes an eighth group of fields 223b that allows the administrator to configure a type and frequency of reminders or messages to be automatically generated and sent (by the module 130) to the employee (mentioned in the fourth field 216b). Thus, in some embodiments, first and second check-boxes 223b' allow the administrator to choose email and/or SMS as types of reminders while a drop-down list 223b" allows the administrator to choose a frequency from a plurality of predefined reminder frequencies or periodicities. In various embodiments, the reminder frequencies may range from, for example, daily, alternate days, bi-week, weekly, fortnightly or monthly. In embodiments, a choice of the reminder frequency may be dependent on a user-profile (approver, implementer, or reviewer) of the employee and/or urgency of implementation of the rule. For example, if the rule is critical to a business process and requires urgent certification of completion/implementation, the administrator may choose a more frequent reminder option such as, say, daily. In embodiments, the automatically generated reminders or messages may be turned off, or otherwise terminated, by the administrator or by virtue of the employee having met one or more requirements. Upon meeting the one or more requirements, the reminder or message is automatically terminated without further action by the administrator or employee.

In some embodiments, the GUI 200b further includes a ninth field 224b that allows the administrator to configure a frequency or periodicity at which a certificate of implementation or fulfillment of the rule (in the second field 212b) must be obtained. Based on the frequency or periodicity, the module 130 automatically enables a triggering of re-certification of the rule. In some embodiments, the ninth field 224b is configured as a pre-populated drop-down list. In embodiments, the re-certification frequency or periodicity may range in months and years.

Once, the administrator has input his responses in the first, second, third, fourth, fifth, sixth, seventh, eighth and ninth fields 210b, 212b, 214b, 216b, 218b, 220b, 222b, 223b and 224b he may click on the 'save' button 225b to store the input rule and associated data including the department, employee designation, employee name, state, regulation, user-profile and reminders in the at least one database 120. Stated differently, the rule is associated with the type of rule or department, employee designation or role, employee name, state, regulation, user-profile and reminders. This association results in the rule being automatically assigned to a specific department, designation/role and employee, manager or executive within the organization for further approval, implementation or review.

In embodiments, consequent to saving the input rule and associated data, a reminder or message is auto-generated by the module 130 and sent to the employee (of the fourth field 216b) prompting him to review the applicable rule and establish the organization's position—that is, approve, deny or analyze to decide full, partial or no approval of the rule.

It should be appreciated that the drop down lists of the first, third, fourth, fifth, sixth and ninth fields 210b, 214b, 216b, 218b, 220b (as well as the reminder frequency field 223b") and 224b are pre-populated with related data pre-stored and accessed from the at least one database 120.

GUI 200c

In some embodiments, the GUI 200c enables the administrator to view summarized data associated with a plurality of rules input and stored using the GUI 200b. In embodiments, the GUI 200c is generated by the rules and workflow management module 130 and is populated with a plurality of data that is accessed (by the rules and workflow management module 130) from the at least one database 120 and processed, for display, if required. Referring now to FIG. 2C, in some embodiments, the GUI 200c displays recently added rule(s) in a first visual grid 210c, count of rules by first, second and third states in a second visual grid 220c and various parts of an organization such as, for example, departments, roles or functions in a third visual grid 230c. The first visual grid 210c includes a plurality of rows and columns. A first column 212c displays data indicative of one or more recently added rule(s) 213c in respective one or more rows 214c. In some embodiments, all rules added by the administrator in the recent, say, N days, are displayed. In some embodiments, N ranges from 1 day to 90 days and preferably 30 days. As a non-limiting example, the first visual grid 210c shows a single recently added rule 213c in a first row 214c. In some embodiments, the displayed rule 213c is hyperlinked which when clicked may generate another GUI to display further details, notes or explanations related the rule, associated data and/or relevant documentation describing details and sub-rules that may be accessed from the at least one database 120. A second column 215c displays an alternate method of referring to the displayed rule 213c. A third column 216c displays data indicative of a regulation or authority associated with each of the rules 213c. A fourth column 217c displays data indicative of a state (first, second or third) associated with each of the rules 213c. A fifth column 218c displays data indicative of the workflow. A sixth column 219c displays data indicative of a status of active or inactive associated with each of the rules 213c, such as whether the rule is actively being applied, and therefore must be adhered to, or not active and need not be considered. Each X data, regulation data, state data, Y data and status data is visually aligned, horizontally, in each row, with the associated rule 213c. For example, the rule 213c in the first row 214c is visually aligned, horizontally, with X data, regulation, the first state indicative of the rule being always approved or implemented, Y data, and an active status. In some embodiments, data in the first visual grid 210c may be sorted, in ascending or descending order, with respect to data in any of the columns.

The second visual grid 220c displays data indicative of a count of rules by regulations and states (first, second and third states). In some embodiments, the grid 220c includes a first column 221c that displays one or more regulations in respective one or more rows, a second column 222c that displays a total count of rules (across the first, second and third states) related to each of the regulations, a third column 223c that displays a count of rules associated with the second state, a fourth column 224c that displays a count of rules associated with the first state and a fifth column 225c that displays a count of rules associated with the third state.

Data in each of the second, third, fourth and fifth columns 222c, 223c, 224c and 225c is visually aligned, horizontally, in each row, with the associated regulation in the first column 221c. For example, the first row 226c displays that for a particular contract or regulation (first column 221c) there are a total of 90 rules (second column 222c) of which 21 rules are of the second state (third column 223c), 19 rules are of the first state (fourth column 224c) and 50 rules are of the third state (fifth column 225c). A final row 227c provides, in the second column 222c—a grand total of the count of all rules related to all regulations, in the third column 223c—a grand total of the count of all second state rules related to all regulations, in the fourth column 224c—a grand total of the count of all first state rules related to all regulations, and in the fifth column 225c—a grand total of the count of all third state rules related to all regulations.

The second visual grid 230c displays data related to various departments, roles or functions as accessed from the at least one database 120. In some embodiments, the grid 230c includes a first column 232c that displays a plurality of departments, roles or functions of the organization in a plurality of respective rows 233c. A second column 235c displays names of a plurality of managers/executives in the plurality of rows 233c such that each manager/executive is visually aligned, horizontally, in each row, with the associated department, role or function. A third column 238c displays a number of users logged into the system 100 from each of the department, role or function.

GUI 200d

As discussed earlier, with reference to GUI 200b, as a result of the administrator's data inputs each rule is associated with at least the department, employee designation or role, employee name, rule state (first, second or third), regulation and user-profile. This association results in each rule being automatically assigned to a specific department, designation/role and employee, manager or executive within the organization for further approval/review and implementation. Accordingly, the GUI 200d displays a visual grid 202d that presents an association of each rule with a department along with a state and implementation status. In embodiments, the GUI 200d is generated by the rules and workflow management module 130 and is populated with a plurality of data that is accessed (by the rules and workflow management module 130) from the at least one database 120 and processed for display, if required.

It should be appreciated that, in some embodiments, the data view of the GUI 200d is not only accessible to the administrator but also to other organizational entities or executives depending upon their role/designation. Thus, in some embodiments, along with the administrator all entities or executives designated or authorized as approvers and implementers may also access the data view of the GUI 200d by logging into the at least one server 105 from their respective client devices 10. In some embodiments, along with the administrator all entities or executives designated or authorized as approvers may access the data view of the GUI 200d. In some embodiments, all entities or executives designated or authorized as approvers and implementers may also access the data view of the GUI 200d while the administrator may not be authorized to access the GUI 200d. In some preferred embodiments, the data view of the GUI 200d is accessible to the administrator and approvers but not to implementers. Additionally, in some embodiments, at least one reviewer (who may be an entity internal or external to the organization) may also have the necessary permissions to access the data view of the GUI 200d in order to conduct a review process.

Referring now to FIG. 2D, the visual grid 202d includes a plurality of rows and columns. A first column 204d displays data indicative of one or more rules in respective one or more rows 206d. In some embodiments, each of the displayed rules is hyperlinked which when clicked may generate another GUI to display further details, notes or explanations related to the rule, associated data and/or relevant documentation describing details and sub-rules that may be accessed from the at least one database 120.

A second column 208d displays data indicative of the first, second or third state associated with each of the one or more rules. In some embodiments, a state associated with a rule initially depends on the state input by the administrator through the fifth field 218b of GUI 200b. However, in some embodiments, the state may be modified (to another state) by an approver (who may or may not be the same as an implementer) and therefore the second column 208d reflects the most recent first, second or third state. In some embodiments, any of the first, second or third state may be modified from one state to another. In some embodiments, not all types of states may be allowed to be modified by the approver. For example, in some embodiments, only the third state (corresponding to a rule requiring analyses to decide full, partial or no acceptance/implementation of the rule) may be modified to the first or second state by an approver.

The second column 208d is followed by a plurality of columns wherein each column is dedicated to a department, role or function and displays data indicative of a role implementation status related to one or more actions pertaining to a rule. In some embodiments, third, fourth, fifth, sixth, seventh, eighth, ninth, tenth, eleventh, twelfth, thirteenth, fourteenth, fifteenth, sixteenth, seventeenth, eighteenth, nineteenth and twentieth columns 210d, 211d, 212d, 213d, 214d, 215d, 216d, 217d, 218d, 219d, 220d, 221, 222d, 223d, 224d, 225d, 226d and 227d are dedicated, respectively, to the departments, roles or functions (such as those shown in the second visual grid 230c of FIG. 2C). Each of these columns related to the departments, roles or functions displays data indicative of the rule implementation status—that is, whether a rule, and therefore any task(s) associated with the rule, assigned to a department has been followed, fulfilled, abided by or adhered to. Thus, the data indicative of the rule implementation status changes depending on a progress being made and logged into the system by a department, role or function, with respect to a rule assigned to the department, role or function.

In various embodiments, the data indicative of the rule implementation status may communicate a) if the rule has been implemented (first rule implementation status), b) if the rule has not been implemented and no progress has been made on its implementation (second rule implementation status) or c) if implementation of the rule is in-progress (third rule implementation status). In some embodiments, the data indicative of the rule implementation status is a certificate of implementation or fulfillment of the rule.

In some embodiments, the data indicative of the rule implementation status is visually communicated, through the visual grid 202d, by way of a visual icon. In various embodiments, the visual icon could be of different shapes, sizes, colors, textures, orientations, blink rates, imagery (inanimate or animate) and/or other visual traits. As non-limiting examples, in some embodiments, the visual icon could be a tick-mark icon representative of the first rule implementation status, a cross-mark icon representative of the second rule implementation status and a clock icon representative of the third rule implementation status. In some embodiments, the visual icon could be a progress-bar icon which when fully colored in, say, green is representative of the first rule implementation status, when partially colored in green (or, say, yellow color) is representative of the second rule implementation status and when fully colored in, say, red or when fully colored in white is representative of the third rule implementation status.

In various embodiments, the data indicative of the rule implementation status is displayed in a cell of the visual grid 202d, wherein the cell is defined by an intersection of a column and a row and is visually aligned, horizontally (in a row), with a rule. For example, as shown in the visual grid 202d, for a rule titled "certificate of independent price determination" (in second row 206$d_2$) a cell 230d displays a visual icon representative of the first rule implementation status. The cell 230d is defined by an intersection of the fifth column 212d (Finance department) and the second row 206$d_2$ and is visually aligned, horizontally, with the rule in the second row 206$d_2$. Similarly, each of the cell 231d, 232d and 233d also displays a visual icon representative of the first rule implementation status. The cell 231d is defined by an intersection of the seventeenth column 224d (Science and Technology department) and the second row 206$d_2$, cell 232d is defined by an intersection of the eighteenth column 225d (Sales department) and the second row 206$d_2$, and cell 233d is defined by an intersection of the nineteenth column 226d (Services department) and the second row 206$d_2$. Each of the cell 231d, 232d and 233d is visually aligned, horizontally, with the rule in the second row 206$d_2$.

In another example, as shown in the visual grid 202d, for a rule titled "Gratuities"" (in third row 206$d_3$) a cell 235d displays a visual icon representative of the third rule implementation status. The cell 235d is defined by an intersection of the sixth column 213d (HR (C) department) and the third row 206$d_3$ and is visually aligned, horizontally, with the rule in the third row 206$d_3$. Further, a cell 236d displays a visual icon representative of the first rule implementation status. The cell 236d is defined by an intersection of the seventh column 214d (HR (D) department) and the third row 206$d_3$ and is visually aligned, horizontally, with the rule in the third row 206$d_3$.

In some embodiments, data in the visual grid 202d may be sorted, in ascending or descending order, with respect to data in any of the columns 204d, 208d, 210d, 211d, 212d, 213d, 214d, 215d, 216d, 217d, 218d, 219d, 220d, 221, 222d, 223d, 224d, 225d, 226d and 227d.

In some embodiments, data in the visual grid 202d may be filtered using at least one or any combination of first, second and third criteria, wherein the first criterion is that of a regulation (to which a rule may be related to or associated with) and is actuated using a first field 240d, the second criterion is that of a status of the rule (first, second or third status) and is actuated using a second field 242d, and the third criterion is that of a department (to which a rule may have been assigned to) and is actuated using a third field 244d. In some embodiments, each of the first, second and third field 240d, 242d and 244d is configured as a drop-down list of pre-populated data. In some embodiments, data in the visual grid 202d may be searched on the basis of a specific rule using a fourth field 246d configured as a text box.

GUI 300

Figure 3:
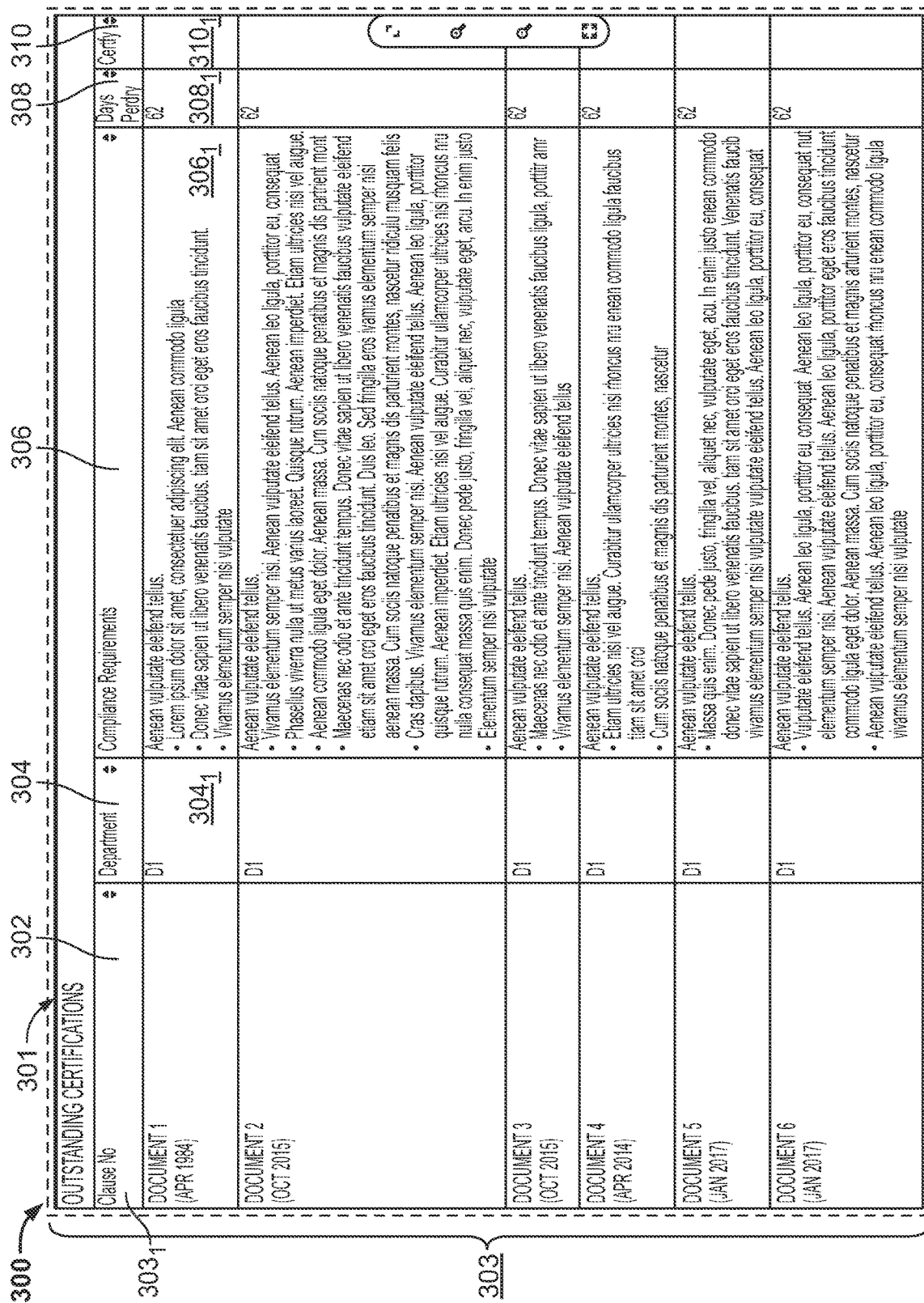
FIG. 3 shows an exemplary GUI communicating a plurality of data related to outstanding certificates indicative of rules that are pending implementation, in accordance with some embodiments of the present specification.

FIG. 3 shows an exemplary GUI 300 communicating a plurality of data related to outstanding certifications indicative of rules that are pending implementation, in accordance with some embodiments of the present specification. In embodiments, the GUI 300 is generated by the rules and workflow management module 130 and is populated with the plurality of data that is accessed (by the rules and workflow management module 130) from the at least one database 120 and processed for display, if required. In some embodiments, the GUI 300 displays a visual grid 301 having a plurality of columns populated with data related to one or more rules for which a certificate of implementation is pending.

In embodiments, the data view of the GUI 300 is accessible to the administrator, approvers and/or implementers depending upon access permissions granted by the administrator based on an organizational protocol. For example, in some embodiments, in addition to the administrator, a Department Head (as an approver) may have access to the GUI 300. Specifically, since the exemplary data in the GUI 300 pertains to the HR department, a Department Head of HR may have access. Additionally, in some embodiments, at least one HR Manager (as implementer) may also have access to the GUI 300. It should be appreciated that certain executives who have organization wide roles and responsibilities, such as the C-suite executives and the Board of Directors, may also have access to the GUI 400a.

As shown in the visual grid 301, a first column 302 displays first data indicative of one or more rules for which a certificate of implementation is pending or outstanding. Each of the one or more rules is presented in a respective row 303. A second column 304 displays second data indicative of the department that is responsible for implementing each of the one or more rules. A third column 306 displays third data indicative of one or more tasks or requirements that must be fulfilled in order to receive a certificate of completion or fulfillment for each of the one or more rules. A fourth column 308 displays fourth data indicative of a time period for which each of the one or more rule is pending completion or fulfillment. In some embodiments, the time period is expressed in number of days. However, in alternate embodiments, the time period may be expressed in weeks, fortnights or months. A fifth column 310 displays fifth data indicative of whether each of the one or more rules is certified as having been completed or fulfilled.

In various embodiments, each of the first, second, third, fourth and fifth data is displayed in a cell of the visual grid 301, wherein the cell is defined by an intersection of a column and a row and is visually aligned, horizontally (in a row), with a rule. For example, as shown in the visual grid 301, for a rule titled "gratuities" (in first row $303_1$) a cell $304_1$ displays the second data. The cell $304_1$ is defined by an intersection of the second column 304 (department) and the first row $303_1$ and is visually aligned, horizontally, with the rule in the first row $303_1$. Similarly, cells $306_1$, $308_1$, $310_1$ respectively display the third, fourth and fifth data. The cell $306_1$ is defined by an intersection of the third column 306 and the first row $303_1$, cell $308_1$ is defined by an intersection of the fourth column 308 and the first row $303_1$, and cell $310_1$ is defined by an intersection of the fifth column 310 and the first row $303_1$. Each of the cells $306_1$, $308_1$, $310_1$ is visually aligned, horizontally, with the rule ("gratuities") in the first row $303_1$.

As an exemplary illustration, the visual grid 301 displays all rules that are pending completion for the HR (C) department. In some embodiments, the visual grid 301 is configured to filter and display rules that are pending completion for a particular department, role or function in the organization. In some embodiments, the visual grid 301 may be configured to display rules that are pending completion for all departments, roles or functions in the organization.

GUIs 400a, 400b

Figure 4A:
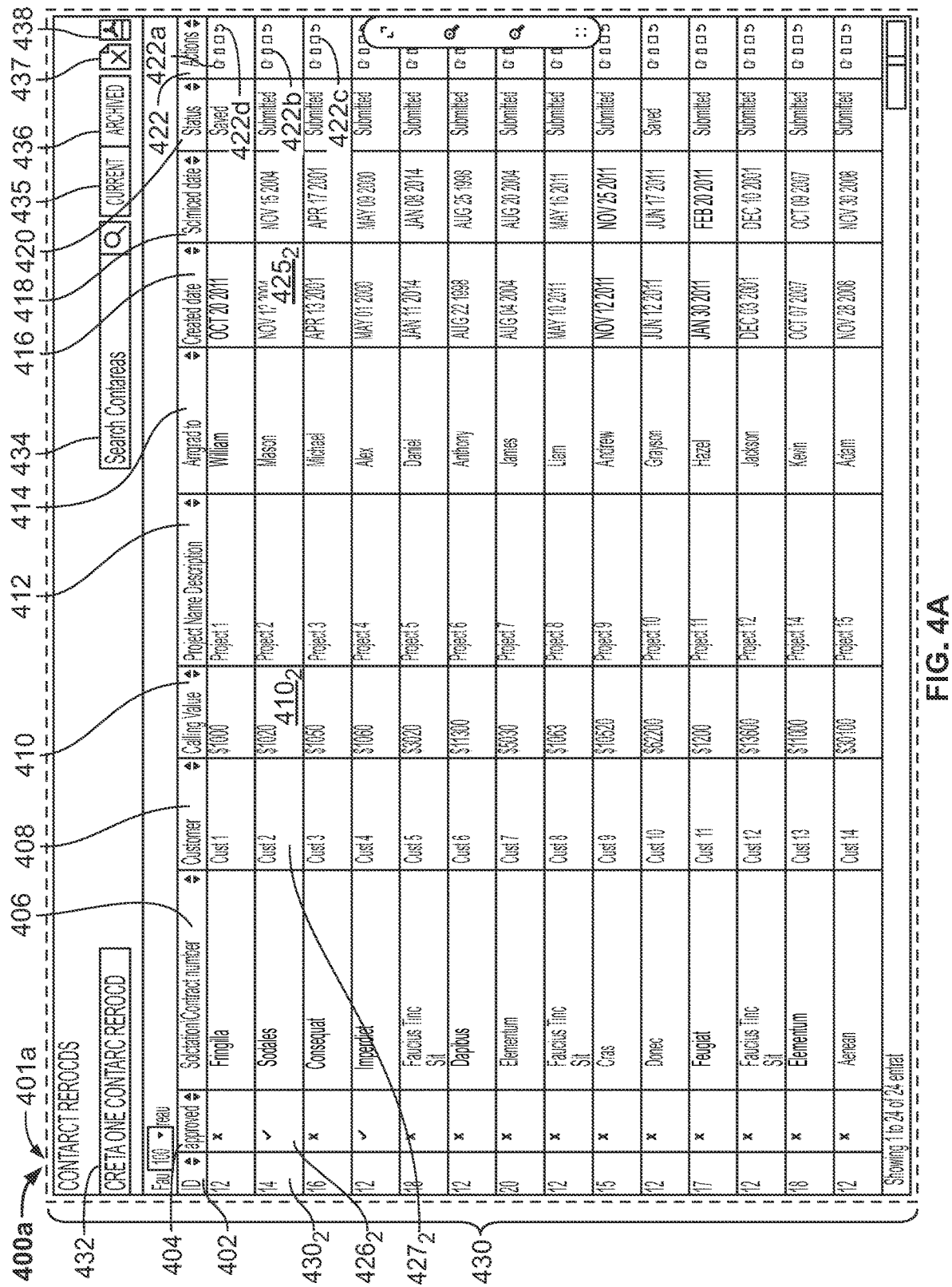
FIG. 4A shows an exemplary GUI communicating a first plurality of data related to one or more data structures, such as contracts, in accordance with some embodiments of the present specification.

FIG. 4A shows an exemplary GUI 400a communicating a first plurality of data related to one or more data structures, such as contracts, in accordance with some embodiments of the present specification. In embodiments, the GUI 400a is generated by the rules and workflow management module 130 and is populated with the first plurality of data that is accessed (by the rules and workflow management module 130) from the at least one database 120 and processed for display, if required. In some embodiments, the GUI 400a displays a visual grid 401a having a plurality of columns populated with data related to one or more contracts.

In embodiments, the data view of the GUI 400a is accessible to the administrator, approvers and/or implementers depending upon access permissions granted by the administrator and based on an organizational protocol. For example, in some embodiments, in addition to the administrator, a Department Head (as approver) may also have access to the GUI 400a. Specifically, since the exemplary data in the GUI 400a pertains to the Contracts Department, a Department Head of Contracts (as the approver) may have access. Additionally, in some embodiments, at least one Contracts Manager (as implementer) may also have access to the GUI 400a. It should be appreciated that certain executives who have organization wide roles and responsibilities, such as the C-suite executives and the Board of Directors, may also have access to the GUI 400a.

As shown in the visual grid 401a, a third column 406 displays third data indicative of one or more data structures, such as contracts, each of the one or more contracts being presented in a respective row 430. A first column 402 displays first data indicative of a serial number or ID (Identification) for each of the one or more contracts. A second column 404 displays second data indicative of a first or second approval status for each of the one or more contracts. The first approval status corresponds to an approval being denied or refused and the second approval status corresponds to an approval being granted. In some embodiments, the second data is visually communicated, through the visual grid 401a, by way of a visual icon and/or textual data. In various embodiments, the visual icon could be of different shapes, sizes, colors, textures, orientations, blink rates, imagery (inanimate or animate) and/or other visual traits. As non-limiting examples, in some embodiments, the visual icon could be a tick-mark icon representative of the first approval status and a cross-mark icon representative of the second approval status. Alternatively, in some embodiments, the textual data could simply be an "approved" text representative of the first approval status and a "disapproved" text representative of the second approval status.

A fourth column 408 displays fourth data indicative a customer name or ID corresponding to each of the one or more contracts. A fifth column 410 displays fifth data indicative of a monetary value of each of the one or more contracts. A sixth column 412 displays sixth data indicative of a project name of each of the one or more contracts. A seventh column 414 displays seventh data indicative of an executive, such as, for example, a contract manager, assigned to each of the one or more contracts. An eighth column 416 displays eighth data indicative of a date of creation of each of the one or more contracts. A ninth column 418 displays ninth data indicative of a date of submission corresponding to each of the one or more contracts. A tenth column 420 displays tenth data indicative of a 'saved' or 'submitted' status corresponding to each of the one or more contracts. An eleventh column 422 displays eleventh data corresponding to each of the one or more contracts. In some embodiments, the eleventh data includes first, second, third and fourth icons 422a, 422b, 422c and 422d each of which being related to a function that is executed, on the data in the visual grid 401a, as a result of a user actuating (for example, by clicking) an icon.

In various embodiments, each of the first, second, third, fourth, fifth, sixth, seventh, eighth, ninth, tenth and eleventh data is displayed in a cell of the visual grid 401a, wherein the cell is defined by an intersection of a column and a row and is visually aligned, horizontally (in a row), with a contract. For example, as shown in the visual grid 401a, for a contract titled "Annual Reps and Certs" (in second row $430_2$) a cell $425_2$ displays the seventh data. The cell $425_2$ is defined by an intersection of the seventh column 414 (assigned executive name) and the second row $430_2$ and is visually aligned, horizontally, with the contract in the second row $430_2$. Similarly, as further illustration, cells $426_2$, $427_2$, $428_2$ respectively display the second, fourth and fifth data. The cell $426_2$ is defined by an intersection of the second column 404 and the second row $430_2$, cell $427_2$ is defined by an intersection of the fourth column 408 and the second row $430_2$, and cell $428_2$ is defined by an intersection of the fifth column 410 and the second row $430_2$. Each of the cell $426_2$, $427_2$, $428_2$ is visually aligned, horizontally, with the contract ("Annual Reps and Certs") in the second row $430_2$.

A virtual button 432 when actuated enables the user to create and add data related to a new contract record for addition to the visual grid 401a. A search field 434 enables the user to search for data related to specific contracts within the visual grid 401a. The user can further specify to search contracts that are current 435 (that is, the ones that have been created or submitted within a predefined period of time such as, for example, within a year) or archived 436. Data displayed in the visual grid 401a can be further downloaded in Excel or PDF formats by actuation icons 437, 438 respectively.

Figure 4B:
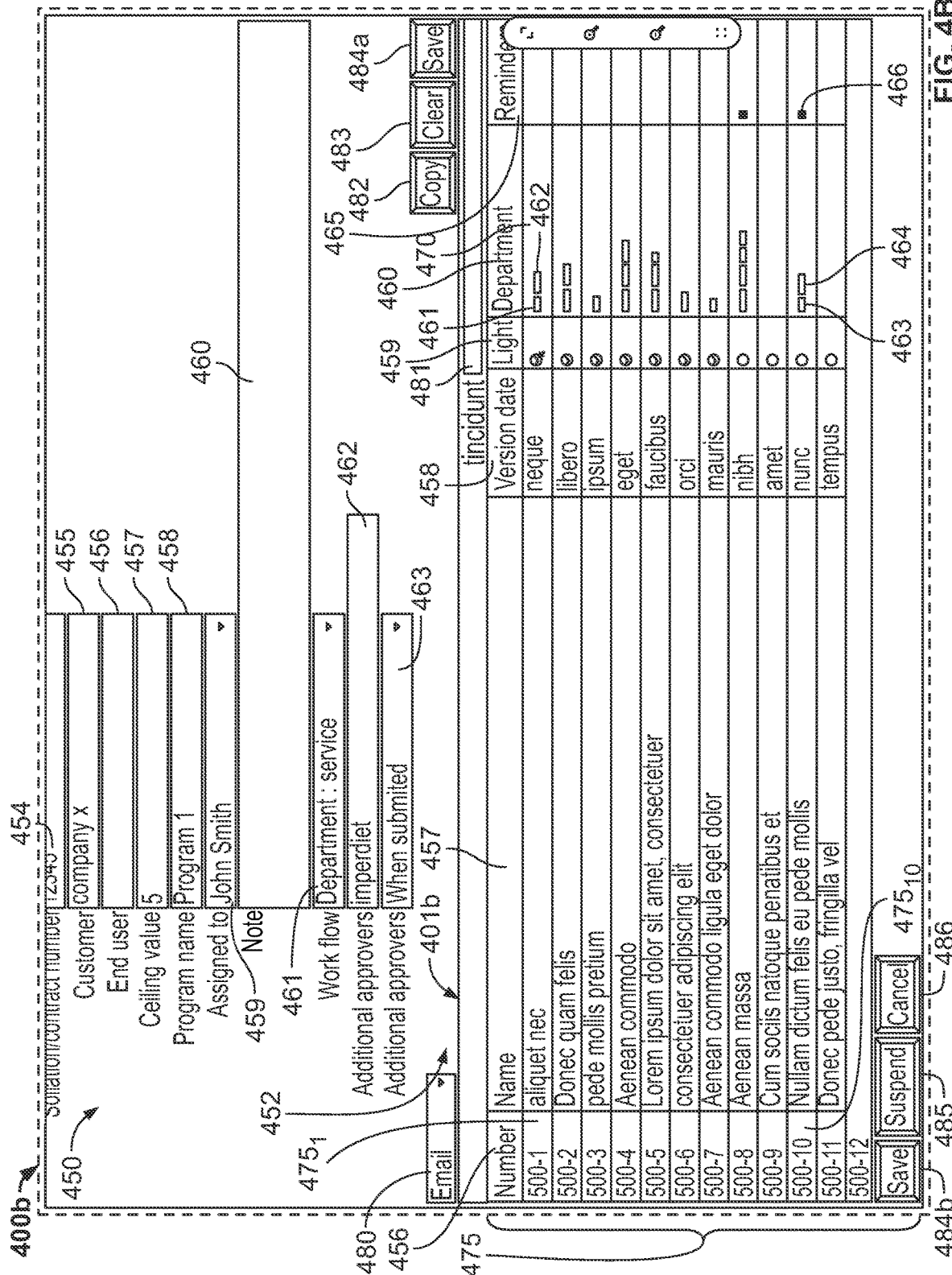
FIG. 4B shows an exemplary GUI communicating a second plurality of data with reference to one of the one or more data structures, such as contracts (displayed in the GUI of FIG. 4A), in accordance with some embodiments of the present specification.

FIG. 4B shows an exemplary GUI 400b communicating a second plurality of data with reference to one of the one or more contracts (displayed in GUI 400a), in accordance with some embodiments of the present specification. In embodiments, the GUI 400b is generated by the rules and workflow management module 130 and is populated with the second plurality of data that is accessed (by the rules and workflow management module 130) from the at least one database 120 and processed for display, if required. In some embodiments, the GUI 400b displays a visual grid 401b having a plurality of columns showing data related to one of the one or more contracts.

In embodiments, the data view of the GUI 400b is accessible to the administrator, approvers and/or implementers depending upon access permissions granted by the administrator based on an organizational protocol. For example, in some embodiments, in addition to the administrator, a Department Head (as approver) may also have access to the GUI 400b. Specifically, since the exemplary data in the GUI 400a pertains to the Contracts department, a Department Head of Contracts (as the approver) may have access. Additionally, in some embodiments, at least one Contracts Manager (as implementer) may also have access to the GUI 400b. It should be appreciated that certain executives who have organization wide roles and responsibilities, such as the C-suite executives and the Board of Directors, may also have access to the GUI 400b.

In some embodiments, the GUI 400b is generated when the user clicks on data indicative of any one of the contract records displayed in the GUI 400a. For example, if the user clicks in cell $425_2$ (or in any cell of the second row $430_2$) then the GUI 400b is presented to the user with data related to the contract titled "Annual Reps and Certs" (in the second row $430_2$ of GUI 400a).

Referring now to FIG. 4B, the GUI 400b has a first region 450 and a second region 452. The first region 450 displays a first field 454 with a title of a contract to which the GUI 400b pertains to, a second field 455 with a customer name associated with the contract, a third field 456 identifying an end user, a fourth field 457 with a monetary value associated with the contract, a fifth field 458 with a project/program name associated with the contract, a sixth field 459 with the name of an executive, such as, for example, a contract manager, to whom the contract has been assigned to for overall fulfillment and completion, a seventh field 460 for displaying textual notes associated with the contract, an eighth field 461 identifying a business process to which the contract is associated with—for example, the contract titled "Annual Reps and Certs" is associated with a service process of a threat detection product, a ninth field 462 with the name of an additional approver and a tenth field 463 identifying an email ID of the additional approver.

The second region 452 presents data in a visual grid 401b. As shown in the visual grid 401b, a second column 457 displays second data indicative of one or more rules associated with the contract, each of the one or more rules being presented in a respective row 475. In various embodiments, the one or more rules are associated with the contract by the administrator, approver and/or implementer and the association is stored in the at least one database 120. A first column 456 displays first data indicative of a unique ID associated with each of the one or more rules. A third column 458 displays third data indicative of a version date corresponding to each of the one or more rules. A fourth column 459 displays fourth data indicative of one of the first, second or third state associated with each of the one or more rules.

A fifth column 460 displays fifth data indicative of one or more departments to which each of the one or more rules are assigned. For example, a rule titled "certificate of independent price determination" in the first row $475_1$ has been assigned to first and second departments 461, 462 (in the fifth column 460), wherein the first department 461 is, say, finance and the second department 462 is, say, services. In some embodiments, the fifth data is presented in the form of a visual icon and/or textual data for each of the one or more departments. In various embodiments, the visual icon could be of different shapes, sizes, colors, textures, orientations, blink rates, imagery (inanimate or animate) and/or other visual traits.

As non-limiting examples, in some embodiments, each of the first and second departments 461, 462 is represented with a green colored visual icon bearing the name of the department (finance and services, in this case). In some embodiments, a color of the visual icon is indicative of one of a first, second or third implementation status of the assigned rule (displayed in the second column 457). Thus, as an example, a green color is indicative of the first implementation status signifying that the rule has been implemented or fulfilled, a yellow color is indicative of the second implementation status signifying that implementation of the rule is in-progress, whereas a red color is indicative of the third implementation status signifying that the rule has not been implemented and no progress has been made on its implementation.

A sixth column 465 displays sixth data indicative of whether or not one or more reminders have been sent to a department (of the fifth column 460) to which a rule (of the second column 457) has been assigned. In some embodiments, the sixth data is presented in the form of a visual icon and/or textual data. In some embodiments, the visual icon could represent an email icon signifying that an email reminder. In some embodiments, the textual data could represent a text "email reminder sent dated mm/dd/yyyy". As an example, a rule titled "authorization to perform" in the tenth row $475_{10}$ has been assigned to first and second departments 463, 464 (in the fifth column 460), wherein the first department 463 is shown in red (indicative of the third implementation status) and the second department 464 is shown in green (indicative of the first implementation status). Consequently, the sixth column 465 shows an email icon 466 signifying that at least one email reminder has been sent to the first department 463 that has made no progress on the rule in the tenth row $475_{10}$. In some embodiments, the email icon 466 when clicked allows the user to view contents of the at least one email reminder.

In various embodiments, each of the first, second, third, fourth, fifth and sixth data is displayed in a cell of the visual grid 401b, wherein the cell is defined by an intersection of a column and a row and is visually aligned, horizontally (in a row), with a rule in the second column 457. For example, as shown in the visual grid 401b, for the rule titled "certificate of independent price determination" (in the first row $475_1$) a cell 470 displays visual icons corresponding to the first and second departments 461, 462 (in the fifth column 460). The cell 470 is defined by an intersection of the fifth column 460 (for departments) and the first row $475_1$ and is visually aligned, horizontally, with the rule in the first row $475_1$.

In some embodiments, an eleventh field 480 allows the user to filter data in the visual grid 401b based on a regulation selected from a drop-down list of regulations. A twelfth field 481 allows the user to search specific data in the visual grid 401b.

In some embodiments, a first button 482 when clicked allows the user to generate a second set of records comprising a copy of the data related to the contract ("Annual Reps and Certs") being currently displayed in the GUI 400b. This functionality is advantageous and convenient for the user when new contract records are required to be generated, data for which are broadly similar to those of an existing contract.

With a single click on the first button 482, the user can replicate existing contract data to generate new contract data. If required, the so generated new contract data may be quickly edited with respect to rules.

In some embodiments, a second button 483 when clicked allows the user to export the data in a first format. Third and fourth buttons 484a, 484b when clicked allows the user to save any changes that have been made to the data displayed in the GUI 400b. In some embodiments, a fifth button 485 when clicked allows the user to export the data in a second format. A sixth button 486 when clicked allows the user to cancel working on and exit the GUI 400b.

GUI 500

In accordance with aspects of the present specification, at least one reviewer, internal or external to the organization, may be designated and authorized by (the administrator) to review implementation or fulfillment status of various rules by various concerned departments. In some embodiments, the at least one reviewer is a third-party responsible for conducting a review process at a predefined frequency or periodicity. The at least one reviewer is provided necessary permissions (by the administrator) within the system 100 to be able to access relevant data and GUIs required to conduct the review process and generate one or more review reports.

Figure 5A:
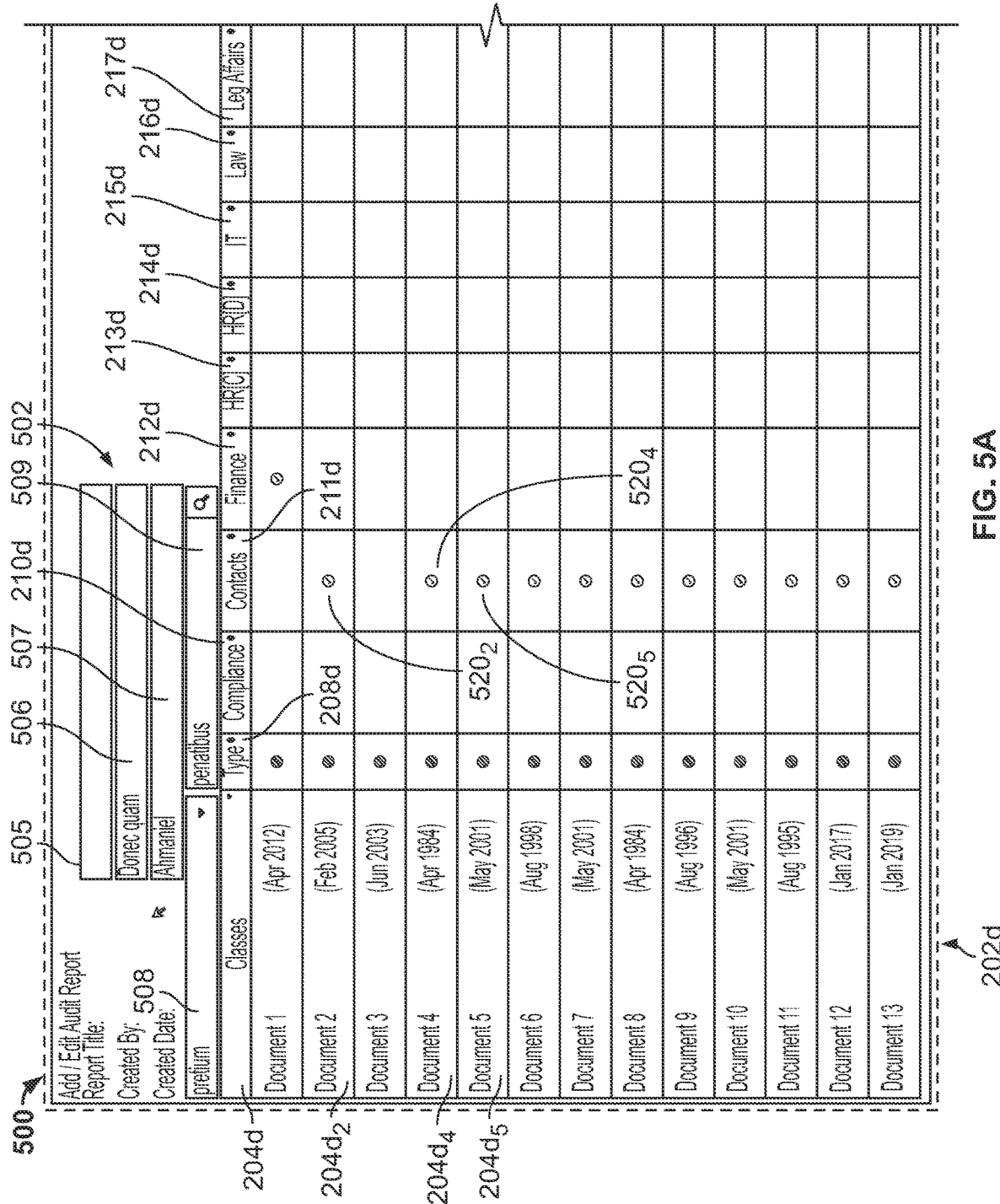
FIG. 5A shows an exemplary GUI accessible to a reviewer in order to generate a review report, in accordance with some embodiments of the present specification.

FIG. 5A shows an exemplary GUI 500 accessible to a reviewer in order to generate a review report, in accordance with some embodiments of the present specification. In embodiments, the GUI 500 is generated by the rules and workflow management module 130 and is populated with data that is accessed (by the rules and workflow management module 130) from the at least one database 120 and processed for display, if required.

In embodiments, the GUI 500 has a first region 502 and a second region 504. The first region 502 displays a first field 505, configured as a text box, to enable the reviewer to input a title of the review report corresponding to the data in the second region 504. Second and third fields 506, 507 are, respectively, automatically populated with the name of the reviewer (who is accessing the data view of the GUI 500) and a date of creation/generation of the review report. In some embodiments, the second and third fields 506, 507 cannot be edited or modified by the reviewer.

In some embodiments, the GUI 500 may further include a fourth field 508 that allows the reviewer to filter the data in the second region 502 based on a regulation. In some embodiments, the fourth field 508 is configured as a drop down list of pre-populated regulations. A fifth field 509 enables the reviewer to search data in the second region 502 based on a rule.

In some embodiments, the second region 504 displays the visual grid 202d of FIG. 2D populated with data indicative of a plurality of rules, associated with at least one contract, and their corresponding first, second or third state as well as review/implementation status across departments responsible for each of the plurality of rules. As discussed earlier in this specification, the visual grid 202d displays the data in the first, second third, fourth, fifth, sixth, seventh, eighth, ninth, tenth, eleventh, twelfth, thirteenth, fourteenth, fifteenth, sixteenth, seventeenth, eighteenth, nineteenth and twentieth columns 204d, 208d, 210d, 211d, 212d, 213d, 214d, 215d, 216d, 217d, 218d, 219d, 220d, 221, 222d, 223d, 224d, 225d, 226d and 227d.

Figure 5B:
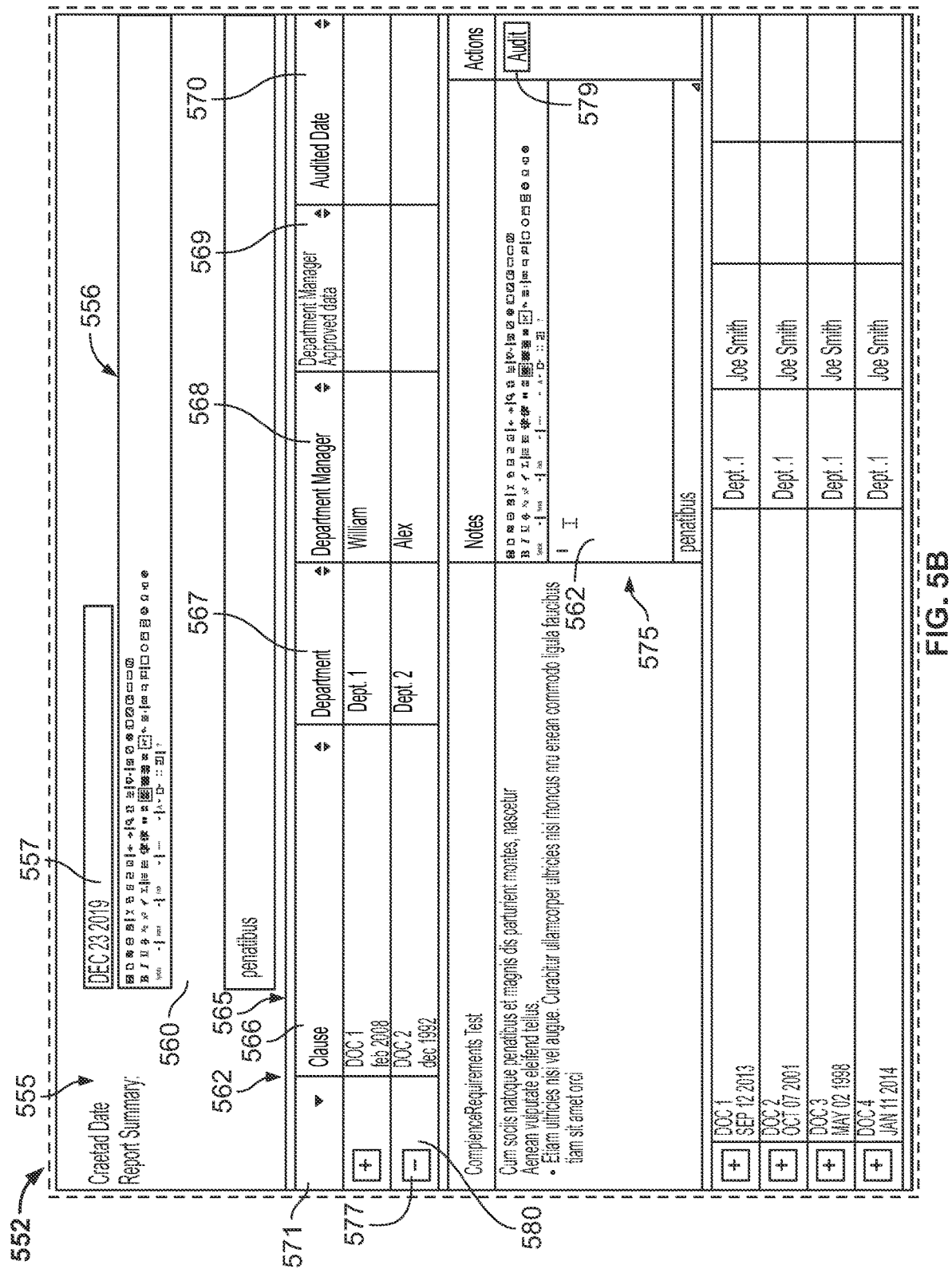
FIG. 5B shows a data view accessible, through the exemplary GUI of FIG. 5A, to enable the reviewer to add a review note to one or more rules associated with a department, in accordance with some embodiments of the present specification.

FIG. 5B shows a data view 552 accessible, in some embodiments, through the exemplary GUI 500 to enable the reviewer to add a review note to one or more rules associated with a department, in accordance with some embodiments of the present specification. Referring to FIGS. 5A and 5B, in some embodiments, the reviewer can multi-click (for example, double-click) on a plurality of data record cells (vertical cells) under any one of the department columns (third, fourth, fifth, sixth, seventh, eighth, ninth, tenth, eleventh, twelfth, thirteenth, fourteenth, fifteenth, sixteenth, seventeenth, eighteenth, nineteenth and twentieth columns 210d, 211d, 212d, 213d, 214d, 215d, 216d, 217d, 218d, 219d, 220d, 221, 222d, 223d, 224d, 225d, 226d and 227d) to select multiple data record cells and to generate the data view 552 specific to the department and the rules associated with the selected multiple data record cells (vertical cells). As a non-limiting example, the reviewer may double-click and select the data record cells $520_2$, $520_4$, and $520_5$ (associated with the fourth column 211d of the Contracts departments) as a result of which the reviewer is presented with the data view 552 that presents data indicative of the rules $204d_2$, $204d_4$ and $204d_5$ associated with the Contracts department.

Alternatively, in some embodiments, the reviewer can single-click on a single data record cell under any one of the department columns to select the single data record cell and to generate the data view 552 specific to the department and the rule associated with the single data record cell. For example, if the reviewer single-clicks to select the data record cell $520_5$ (associated with the fourth column 211d of the Contracts departments) the reviewer will be presented with the data view 552 populated with data indicative of the rule $204d_5$ associated with the Contracts department.

In some embodiments, the reviewer can multi-click (for example, double-click) on a plurality of data record cells (horizontal cells) associated with any one rule but spanning across a plurality of departments to select multiple data record cells and to generate the data view 552 specific to the rule and the plurality of departments associated with the selected multiple data record cells (horizontal cells). For example, the reviewer may double-click and select the data record cells $520_2$, $522_2$, and $523_2$ (associated with the second row $204d_2$ of the fourth, eleventh and nineteenth columns 211d, 218d, 226d associated with the Contracts, Operations and Services departments) as a result of which the reviewer is presented with the data view 552 populated with data indicative of the rule in the second row $204d_2$ across multiple departments of Contracts, Operations and Services.

Referring now to FIG. 5B, in embodiments, the reviewer is enabled, through the data view 552, to add a first review note 560 that may include a summary of the review report for a department or that may be directed or related to completion/implementation status of multiple rules associated with the department (Contracts department, in this illustration). The reviewer is further enabled to add one or more second review notes 562 each of which may be directed or related to a specific rule.

As shown, the data view 552 has a first region 555 displaying a first notes field 556 that is configured as a Word Editor to enable the reviewer to input the first review note 560 therein. A field 557 displays a date of creation of the review report, the date being automatically populated and associated with the first and second review notes. In embodiments, the date cannot be modified or edited by the reviewer. The data view 552 has a second region 562 displaying a visual grid 565. The visual grid 565 has a first column 566 displaying data indicative of a plurality of rules (for example, rules $204d_2$, $204d_4$ and $204d_5$ associated with the Contracts department), a second column 567 displaying the department (Contracts department, in this illustration) to which each of the plurality of rules is related to, a third column 568 displaying the name of a department manager (approver and/or implementer) responsible for executing on each of the plurality of rules, a fourth column 569 to display the status of approval data, and a fifth column 570 displaying a date of review (conducted by the reviewer) of each of the plurality of rules.

In some embodiments, a sixth column 571 is configured to display a visual icon corresponding to each of the plurality of rules (in each row). A visual icon when clicked causes a second notes field 575 to be generated and displayed for the rule corresponding to the visual icon. The second notes field 575 is configured as a Word Editor to enable the reviewer to input the second review note 562 for the rule. For example, if the reviewer clicks on the visual icon 577 (in the second row 580) the second notes field 575 is generated and displayed to enable the reviewer to add the second review note 562 related to the rule (of the second row 580 and first column 566) titled "Inspection of Research and Development". Once the second review note 562 has been input by the reviewer, he may click on a visual button 579 to associate the second review note 562 with the rule (of the second row 580 and first column 566) titled "Inspection of Research and Development" and save in the at least one database 120. Thus, if required, the reviewer can add a review note to each of the plurality of rules.

It should be appreciated that the data view 552 allows the reviewer to further drill-down (by clicking) on any of the rules records to access additional data related to each of the rules such as, for example, the rule implementation status.

Library of Rules

In accordance with aspects of the present specification and with reference to the GUI 200B of FIG. 2B, data such as the rules input by the administrator, the regulation corresponding to each input rule and the state (first, second or third) associated with each input rule is organized in a data structure, referred to hereinafter as a library of rules, within the at least one database 120. In some embodiments, the library of rules is accessible to all authorized individuals within the organization regardless of departments, roles or functions. In some embodiments, the library of rules is also accessible to entities external to the organization. For example, various companies across different industries may be granted access (by the administrator) to the library of rules.

Access to the library of rules is advantageous in that there is no need to recreate rules such as, for example, those related to standard guidelines, directives or regulations. Instead rules can be conveniently replicated, imported and associated with a product and/or service contract from the library. Additionally, the use of the library prevents errors such as, but not limited to, duplication of rules as a result of typing errors and/or associating a rule to a wrong regulation.

Figure 6:
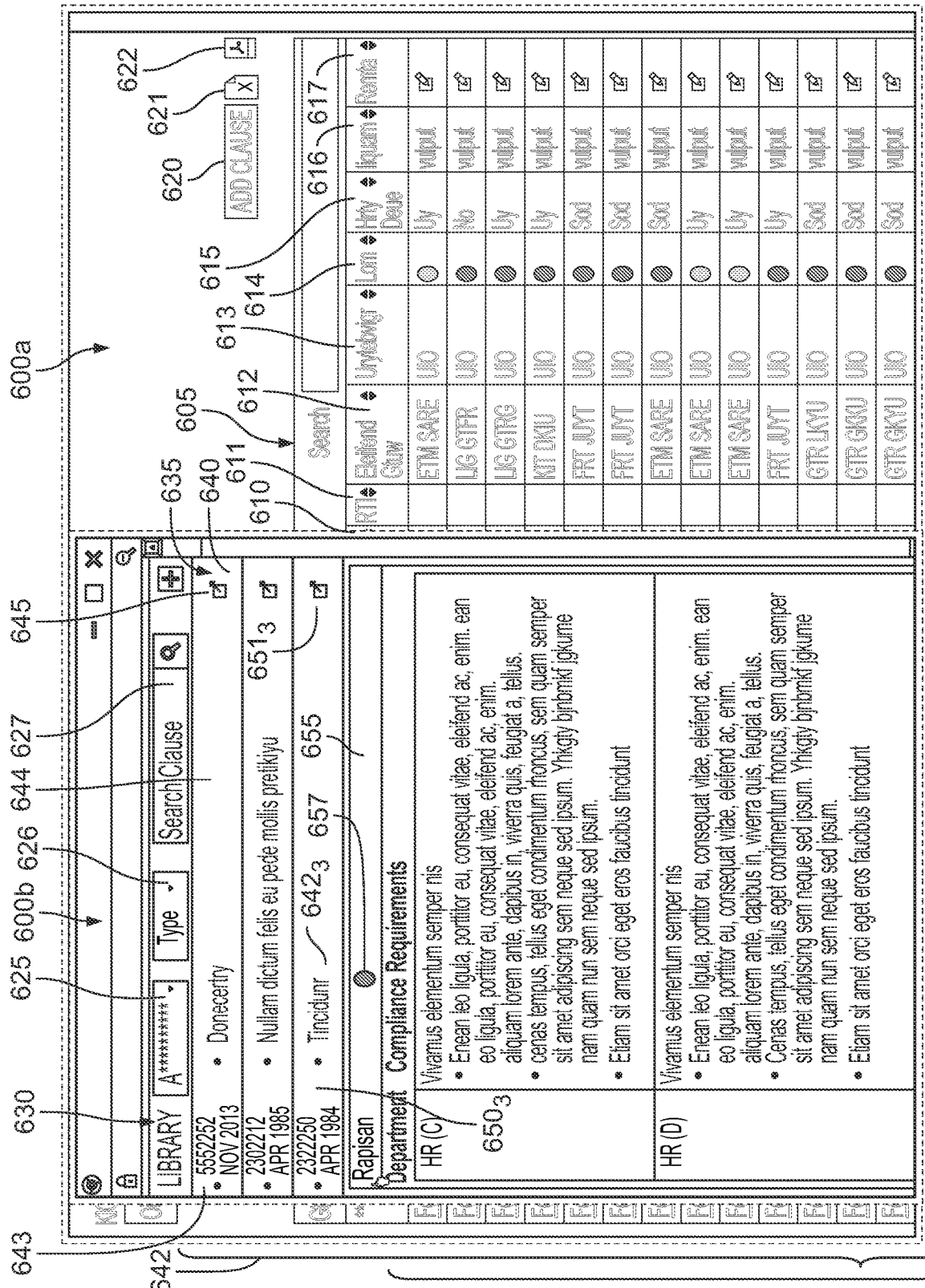
FIG. 6 shows exemplary first GUI communicating a plurality of rules and associated data along with an exemplary second GUI communicating a library of rules, in accordance with some embodiments of the present specification.

FIG. 6 shows an exemplary first GUI 600*a* displaying a plurality of rules and associated data along with an exemplary second GUI 600*b* configured to display a library of rules, in accordance with some embodiments of the present specification.

In some embodiments, the GUI 600*a* displays a visual grid 605 that presents a plurality of rules and associated data accessed from the at least one database 120. As shown in the visual grid 605, a first column 610 displays first data indicative of the plurality of rules, each of the plurality of rules being presented in a respective row of a plurality of rows 630. A second column 611 displays second data indicative of an alternative description of one or more data structures. A third column 612 displays third data indicative of a version date corresponding to each of the plurality of rules. A fourth column 613 displays fourth data indicative of a regulation associated with each of the plurality of rules. A fifth column 614 displays fifth data indicative of a state (first, second or third) associated with each of the plurality of rules. A sixth column 615 displays sixth data indicative of whether each of the plurality of rules are applied to other data structures. A seventh column 616 displays seventh data indicative of whether each of the plurality of rules has an active or inactive status. That is, whether a rule is still a valid/enforceable one or not. Also, an eighth column 617 displays eighth data indicative of at least one action corresponding to each of the plurality of rules.

Data displayed in the visual grid 600*a* can be downloaded in Excel or PDF formats by actuation icons 621, 622 respectively. A visual icon or button 620 is provided to invoke a library of rule and enable the user to add or import one or more rules (and associated data) to the visual grid 600*a*. In some embodiments, the visual icon or button 620 when clicked causes the module 130 to generate and present the second GUI 600*b* to the user.

In some embodiments, the second GUI 600*b* enables a user to access a plurality of pre-stored library of rules and associated data accessed from the at least one database 120. In some embodiments, data from the library of rules may be filtered on the basis of a guideline, directive or regulation using a first field 625 and/or a state (first, second or third) using a second field 626. In some embodiments, each of the first and second fields 625, 626 is configured as a pre-populated drop-down list. A third field 627 enables the user to search for specific rules within the library and is configured as a text box. In some embodiments, the first, second and third fields 625, 626 and 627 are displayed in a first region 630 of the second GUI 600*b*.

In some embodiments, the second GUI 600*b* has a second region 635 displaying a visual grid 640. The visual grid 640 displays data in a plurality of rows and columns. A second column 644 displays second data indicative of a plurality of rules, each of the plurality of rules being displayed in a respective row 642. A first column 643 displays first data indicative of IDs and version dates associated with each of the plurality of rules. Also, a third column 645 displays third data indicative of an action corresponding to each of the plurality of rules. In some embodiments, the third data is configured in the form of a visual icon that could be of different shapes, sizes, colors, textures, orientations, blink rates, imagery (inanimate or animate) and/or other visual traits. In some embodiments, clicking or actuating a visual icon (third data) corresponds to an action of selecting or choosing a rule for import.

In various embodiments, the second and third data are displayed in respective cells of the visual grid 640, wherein the respective cells are defined by intersection of respective columns and rows and are visually aligned, horizontally (in a row), with a first data. For example, as shown in the visual grid 640, for a rule titled "gratuities" (in third row $642_3$) a cell $650_3$ displays the first data and a cell $651_3$ displays the third data. The cell $650_3$ is defined by an intersection of the first column 643 and the third row $642_3$ and is visually aligned, horizontally, with the rule in the third row $642_3$. Similarly, the cell $651_3$ is defined by an intersection of the third column 645 and the third row $642_3$ and is visually aligned, horizontally, with the rule in the third row $642_3$. Now clicking the visual icon in cell $651_3$ results in the action of selecting the rule and associated data (such as, but not limited to, the ID and version date (first data), a regulation data and a state data associated with the rule). The action of selecting causes a copy of the rule and the associated data to be imported from the library to the first GUI 600*a* and therefore stored into a data structure, in the at least one database 120, representative of the data view of the first GUI 600*a*.

In some embodiments, the user can click on the first data to open an information box that displays details or explanation notes related to the second data that is visually aligned with the first data. For example, clicking the cell 650$_3$ opens an information box 655 that displays details or explanation notes related to the rule titled "gratuities" (in the third row 642$_3$). In some embodiments, the information box 655 also displays data 657 indicative of a state (first, second or third) associated with the rule.

Exemplary Workflow 1

Figure 7A:
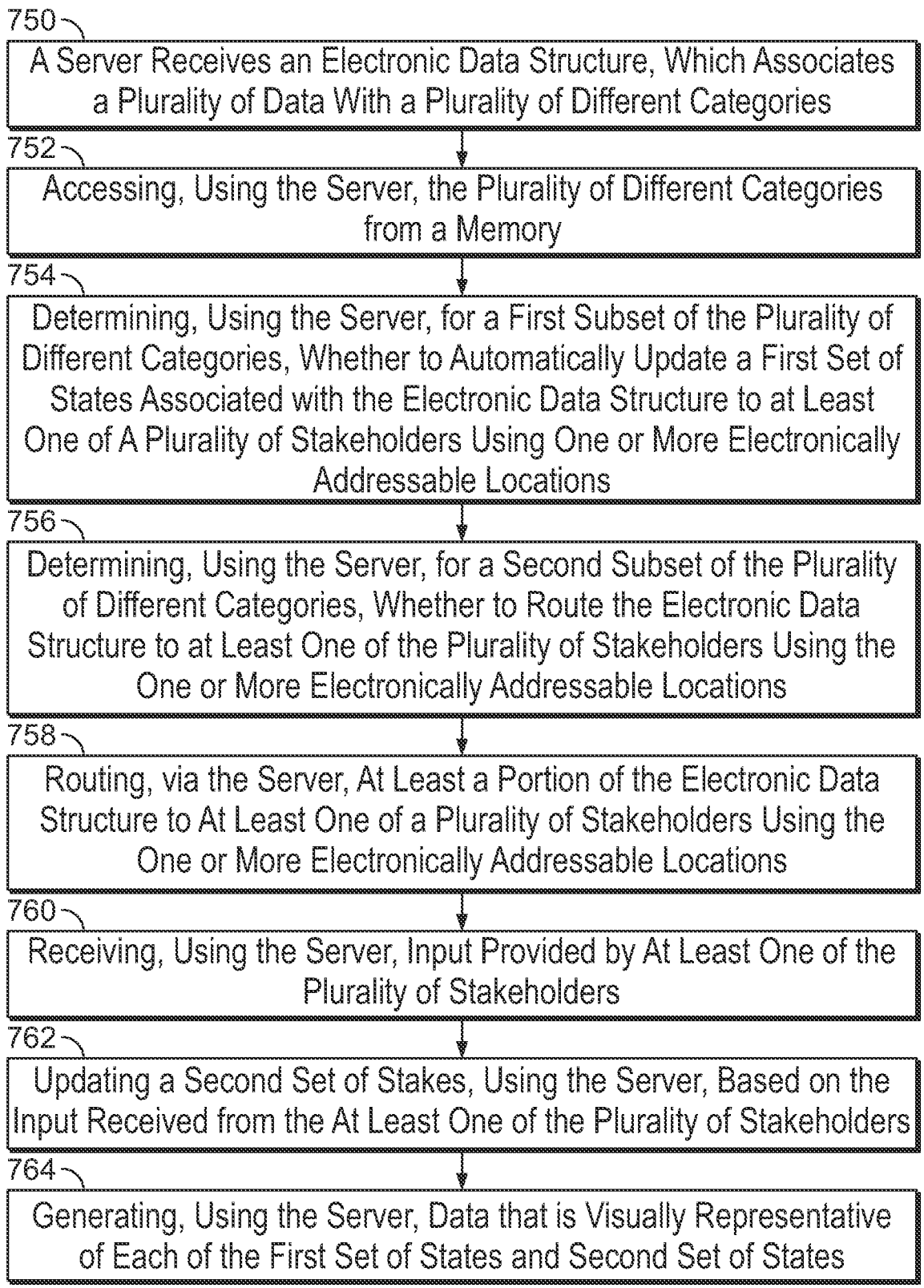
FIG. 7A is a flowchart of a plurality of exemplary steps for automatically processing an electronic data structure.

In embodiments, electronic data structures that contain a plurality of data in at least one category are input into a system having a memory, wherein said memory is then accessed to determine which stakeholders should receive the information and which of the plurality of data can be automatically updated within the electronic data structures. FIG. 7A is a flowchart of a plurality of exemplary steps for automatically processing an electronic data structure. It should be understood that the steps described herein may be implemented in a system in which a plurality of improved GUIs (Graphical User Interfaces), for distributed rules and workflow management in an organization, are generated and displayed, in accordance with some embodiments of the present specification and as described with respect to FIG. 1. In embodiments, the system for automatically processing an electronic data structure includes at least one processor, a first non-transient memory, and a plurality of programmatic instructions stored in the first non-transient memory. In embodiments, the plurality of programmatic instructions are executed by the at least one processor, and cause the server to receive the electronic data structure, wherein the electronic data structure associates a plurality of data with a plurality of different categories. The server may also access the plurality of different categories from a second non-transient memory, wherein the plurality of different categories is stored in the second non-transient memory in association with each of a plurality of stakeholders and wherein each of the plurality of stakeholders is stored in the second non-transient memory in association with one or more electronically addressable locations. In embodiments, the one or more electronically addressable locations comprise an email address, a hardware address, and/or a mobile phone number.

In embodiments, the plurality of programmatic instructions, when executed by the at least one processor, is configured to generate data representative of a graphical user interface wherein the graphical user interface is configured to prompt a user to associate at least one of the plurality of different categories with at least one of the plurality of stakeholders.

In embodiments, the plurality of programmatic instructions, when executed by the at least one processor, is further configured to generate data representative of a graphical user interface wherein the graphical user interface is configured to display, in a first region, data indicative of at least one of the plurality of categories and, in a second region, data indicative of at least one of the first states or the second states.

In embodiments, data indicative of at least one of the plurality of categories comprise a hyperlink, which, when activated causes another graphical user interface to be generated for displaying details related to the at least one of the plurality of categories.

In embodiments, the plurality of programmatic instructions, when executed by the at least one processor, is further configured to send one or more notifications to the at least one of the plurality of stakeholders at the one or more electronically addressable locations after routing and before receiving the input.

Referring back to FIG. 7A, for automatically processing an electronic data structure, at step 750, an electronic data structure is received in a server, wherein the electronic data structure associates a plurality of data with a plurality of different categories. At step 752, using the server, the plurality of different categories is accessed from a memory. In embodiments, the plurality of different categories is stored in the memory in association with each of a plurality of stakeholders. In embodiments, each of the plurality of stakeholders is stored in the memory in association with one or more electronically addressable locations. In embodiments, the one or more electronically addressable locations comprise an email address, a hardware address, and/or a mobile phone number.

Using the server, it is determined at step 754, for a first subset of the plurality of different categories, whether to automatically update a first set of states associated with the electronic data structure without routing the electronic data structure to at least one of the plurality of stakeholders using the one or more electronically addressable locations. Using the server, it is determined, at step 756, for a second subset of the plurality of different categories, to route the electronic data structure to at least one of the plurality of stakeholders using the one or more electronically addressable locations.

At least a portion of the electronic data structure is routed using the server, at step 758, to at least one of the plurality of stakeholders using the one or more electronically addressable locations. In embodiments, after routing and before receiving input, the server is used to send one or more notifications to the at least one of the plurality of stakeholders at the one or more electronically addressable locations.

At least one of the plurality of stakeholders provides input, which is received, at step 760, by the server. At step 762, a second set of states is updated, using the server, based on the input received from the at least one of the plurality of stakeholders. At step 764, data that is visually representative of each of the first set of states and second set of states is generated using the server.

In embodiments, the visually representative data is received at a client device and is displayed such that each of the first set of states and second set of states is visually associated with the electronic data structure. In embodiments, at least one of the first set of states is indicative of at least one of the first subset of the plurality of categories being approved. In embodiments, at least one of the second set of states is indicative of at least one of the second subset of the plurality of categories not being approved. In embodiments, the at least one of the first set of states indicative of being approved is visually distinct from the at least one of the second set of states not being approved.

In embodiments, the server may be employed to generate data representative of a graphical user interface wherein the graphical user interface is configured to prompt a user to associate at least one of the plurality of different categories with at least one of the plurality of stakeholders. In additional embodiments, the server may be employed to generate data representative of a graphical user interface wherein the graphical user interface is configured to display, in a first region, data indicative of at least one of the plurality of categories and, in a second region, data indicative of at least one of the first states or the second states.

In embodiments, data indicative of at least one of the plurality of categories comprise a hyperlink, which, when activated causes another graphical user interface to be generated for displaying details related to the at least one of the plurality of categories.

Exemplary Workflow 2

Figure 7B:
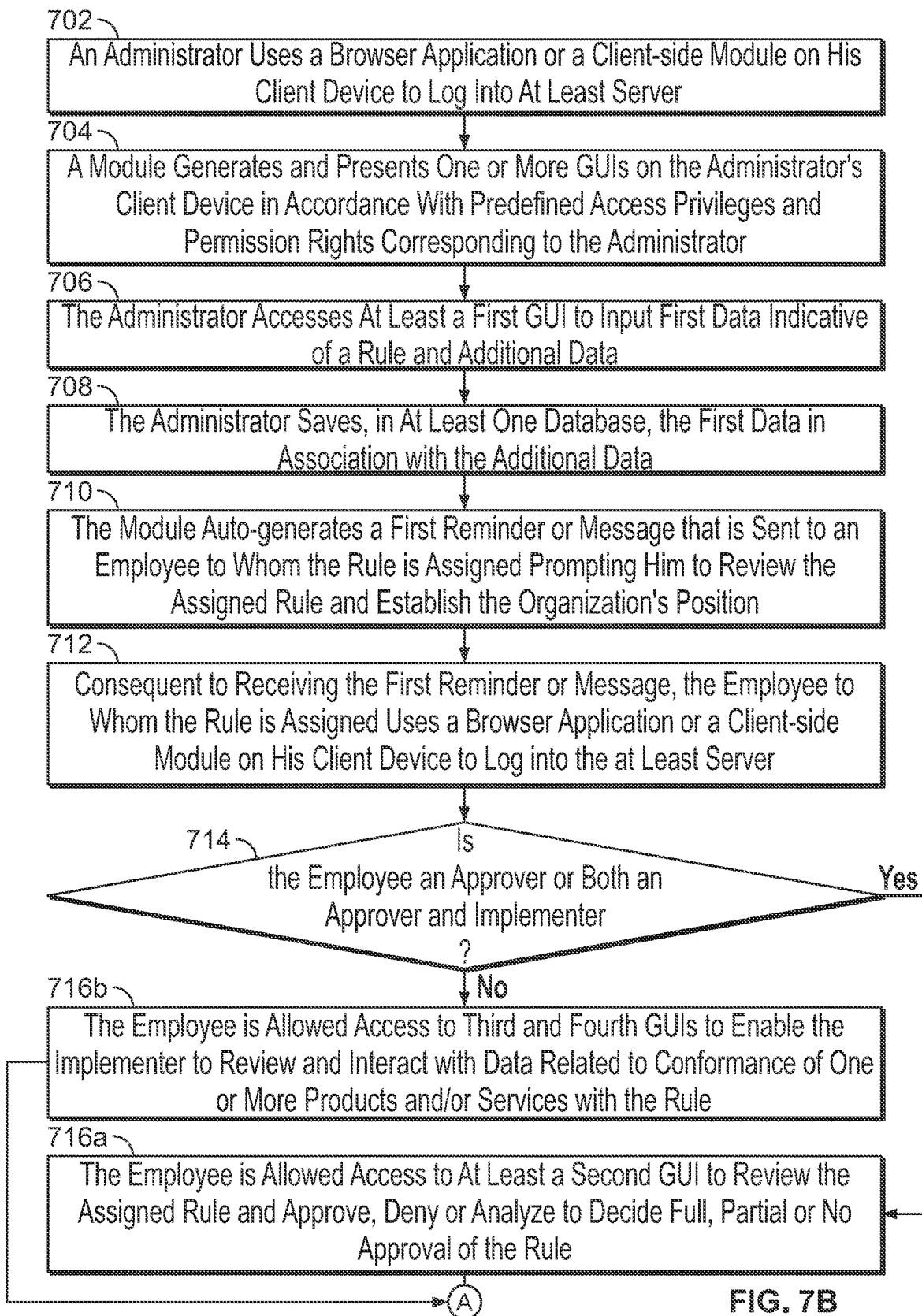
FIG. 7B is a flowchart of a plurality of exemplary steps of implementing a workflow directed towards ensuring that one or more business processes of an organization are in conformance with one or more of a plurality of rules, in accordance with some embodiments of the present specification.
Figure 7B:
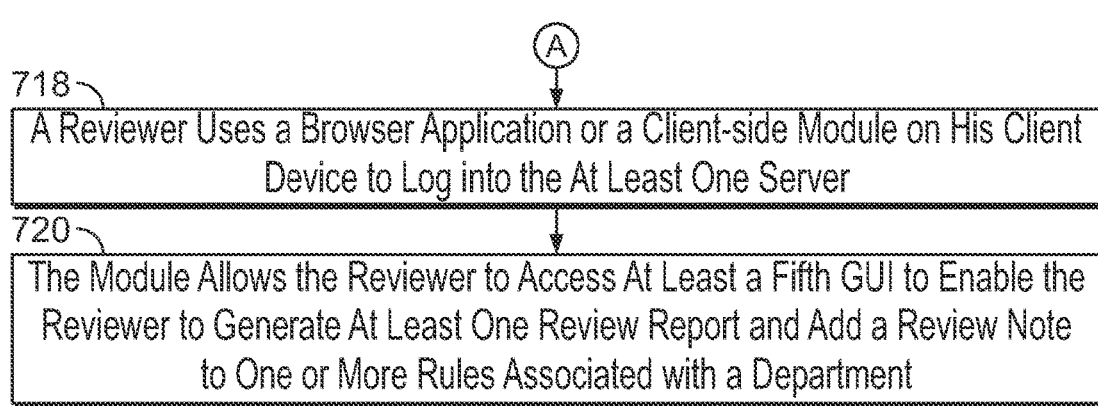

FIG. 7B is a flowchart of a plurality of exemplary steps of implementing a workflow directed towards ensuring that one or more business processes of an organization are in conformance with one or more of a plurality of rules, in accordance with some embodiments of the present specification. Referring now to FIGS. 1 and 7B, at step 702, an administrator uses a browser application or a client-side module on his client device 110 to log into the at least server 105. At step 704, successful logging of the administrator causes the rules and workflow management module 130 to generate and present one or more GUIs on the administrator's client device in accordance with predefined access privileges and permission rights corresponding to the administrator. The one or more GUIs may be populated with data in accordance with the predefined access privileges and permission rights.

At step 706, the administrator accesses at least a first GUI such as, for example, the GUI 200b of FIG. 2B to input first data indicative of a rule and additional data. In some embodiments, the additional data is indicative of, for example, department to which the rule pertains to and is assigned, employee designation to which the rule is assigned, employee name to whom the rule is assigned, rule state (first, second or third), regulation to which the rule relates to, user-profile (approver and/or implementer) of the employee to whom the rule is assigned, type and frequency of reminders to be generated for communication to the employee and a frequency at which to automatically enable a triggering of re-certification (of fulfillment) of the rule.

It should be appreciated that apart from the first GUI (example, GUI 200b of FIG. 2B) the administrator can access a plurality of GUIs to review the first data and the additional data in various ways or views. For example, the administrator may access the GUIs of FIGS. 2C, 2D, 3, 4A, and 4B as and when needed.

In embodiments, the administrator obtains the first data from a competent authority and periodically updates the first data, in the at least one database 120, with respect to the competent authority. It should be appreciated that the competent authority may be internal or external to the organization. For example, a Work Culture and Ethics Committee may be internally formed by a Board of Directors of an organization and formulate a plurality of work, culture and ethics related rules. On the other hand, a Medical Ethics Committee may be an external agency responsible for oversight of medical or human research studies in a country or region and formulate a plurality of rules related to medical or human research.

At step 708, the administrator saves, in the at least one database 120, the first data in association with the additional data.

At step 710, the module 130 auto-generates a first reminder or message that is sent to the employee to whom the rule is assigned prompting him to review the assigned rule and establish the organization's position—that is, approve, deny or analyze to decide full, partial or no approval of the rule. In embodiments, the employee may be designated as an approver, implementer or both based on the data indicative of the user-profile of the employee to whom the rule is assigned.

At step 712, consequent to receiving the first reminder or message, the employee to whom the rule is assigned uses a browser application or a client-side module on his client device 110 to log into the at least server 105.

At step 714, subsequent to successful logging of the employee, the module 130 determines (based on the employee's stored user-profile) if the employee is an approver, implementer or both. If the employee is determined to be an approver or both an approver and an implementer (that is, the employee is associated with the approver user-profile) then, at step 716a, the employee is allowed access to at least a second GUI such as, for example, the GUI 200d of FIG. 2D to review the assigned rule and approve, deny or analyze to decide full, partial or no approval of the rule. In some embodiments, a state associated with the rule initially depends on the state input by the administrator through the GUI 200b (at step 706). However, in some embodiments, the state may be modified (to another state) by the approver (who may or may not be an implementer as well) during review.

Referring to FIG. 2D, in some embodiments, the approver is allowed to click on a cell in the second column 208d to open a dialogue box and modify the current state of a rule (in the first column 204d) visually aligned, horizontally, with the cell. For example, the approver may click the cell 205d (in the fourteenth row $206d_{14}$) to modify the third state (indicative of the rule requiring analyses to decide full, partial or no acceptance/implementation) of the fourteenth rule (in the fourteenth row $206d_{14}$) to the first state (indicative of the rule being approved) or second state (indicative of the rule being denied approval). It should be appreciated that, where a given rule is assigned to multiple persons, each of the multiple persons may approve, deny, or otherwise modify a state of the rule independent of each of the other multiple persons. In such a case, a different status icon would be displayed corresponding to the rule and each of the multiple persons.

It should be appreciated that apart from the second GUI (GUI 200d of FIG. 2D) the approver can access a plurality of GUIs to review the first data and the additional data in various ways or views. For example, the approver may access the GUIs of FIGS. 3, 4A, and 4B as and when needed.

However, if the employee is determined to be only an implementer then, at step 716b, the employee is allowed access to third and fourth GUIs such as, for example, the GUIs 400a and 400b of FIGS. 4A, 4B to enable the implementer to review and interact with data related to conformance of one or more products and/or services with the rule. As non-limiting examples, the GUIs 400a and 400b of FIGS. 4A, 4B enable the implementer (who, in one embodiment, is a Contracts Manager) to review and interact with data related to conformance of one or more products and/or service contracts with the rule.

In some embodiments, the implementer is not allowed access to other GUIs such as, for example, the GUIs of FIGS. 2D and 3 that are accessible to approvers and implementers.

Thus, successful logging of the employee, at step 712, causes the rules and workflow management module 130 to generate and present one or more GUIs on the employee's client device in accordance with predefined access privileges and permission rights corresponding to the employee's user-profile—that is, approver and/or implementer. The one or more GUIs may be populated with data in accordance with the predefined access privileges and permission rights.

At step 718, a reviewer uses a browser application or a client-side module on his client device 110 to log into the at least server 105. At step 720, subsequent to successful logging of the reviewer, the module 130 allows the reviewer to access at least a fifth GUI such as, for example, the GUI 500 of FIG. 5A and the data view 552 of FIG. 5B to enable the reviewer to generate at least one review report and add a review note to one or more rules associated with a department.

It should be appreciated that apart from the fifth GUI the reviewer can access a plurality of GUIs to review the first data and the additional data in various ways or views. For example, the reviewer may access the GUIs of FIGS. 2D, 3, 4A, and 4B as and when needed.

Throughout the workflow, the module 130 auto-generates and sends reminders (related to the first data—that is, the rule assigned) to the approvers and implementers based on the type and frequency of reminders configured by the administrator at step 706.

Also, the module 130 automatically triggers re-certification (of fulfillment) of the rule through one or more of the above described GUIs.

The above examples are merely illustrative of the many applications of the method of the present specification. Although only a few embodiments of the present specification have been described herein, it should be understood that the present specification might be embodied in many other specific forms without departing from the spirit or scope of the invention. Therefore, the present examples and embodiments are to be considered as illustrative and not restrictive, and the specification may be modified within the scope of the appended claims.

We claim:

1. A method of selectively routing data through an electronic network, comprising:

receiving, in a server, an electronic data structure, wherein the electronic data structure comprises a plurality of rules;

using the server, accessing from the electronic data structure each of the plurality of rules;

using the server, accessing a plurality of different categories from a memory;

using the server, associating each of the plurality of rules with the plurality of different categories;

using the server, determining, for a first subset of the plurality of different categories, to automatically update a first set of states associated with each of the accessed plurality of rules without routing the electronic data structure to at least one of a plurality of stakeholders;

using the server, determining, for a second subset of the plurality of different categories, to automatically update a second set of states associated with each of the accessed plurality of rules by routing the electronic data structure to at least one of the plurality of stakeholders;

after routing and before receiving input from the at least one of the plurality of stakeholders, using the server to send one or more notifications to the at least one of the plurality of stakeholders;

using the server, receiving said input from the at least one of the plurality of stakeholders;

using the server, updating at least one of the second set of states based upon the received input;

using the server, generating at least a first graphical user interface configured to receive one or more queries based on at least one of the plurality of different categories;

using the server, generating first data associating each of the plurality of rules with at least one of the plurality of different categories based on the one or more queries;

using the server, generating second data indicative of at least a second graphical user interface, wherein the second graphical user interface is adapted to visually present the first data;

using the server, generating third data indicative of at least a third graphical user interface, wherein the third graphical user interface is adapted to visually present each of the plurality of rules in a visual grid adapted to visually relate each of the plurality of rules with at least one of data indicative of a version, data indicative of a description, and data indicative of being active, inactive, valid or enforceable, wherein the third graphical user interface further comprises an icon that, when activated, causes an overlay graphical user interface to be visually presented atop the visual grid, and wherein the overlay graphical user interface is adapted to display additional rules and is adapted to permit an importing of one or more of the additional rules into the visual grid;

using the server, generating fourth data indicative of at least a fourth graphical user interface, wherein the fourth graphical user interface is adapted to visually present a plurality of rows, each of which is associated with at least one of the plurality of rules, a plurality of columns, each of which is associated with at least one of the plurality of different categories, and a visual icon indicative of a rule implementation status positioned in each intersection of the plurality of rows with the plurality of columns, wherein the rule implementation status is at least one of active, inactive, in-progress, or completed; and wherein each of the plurality of rules is represented in the fourth graphical user interface as hyperlinked data that, when activated, generates an additional graphical user interface adapted to present data specific to a specific one of said each of the plurality of rules.

2. The method of claim 1, further comprising, using the server, generating fifth data representative of at least a fifth graphical user interface wherein the fifth graphical user interface is configured to visually present a visual indicator associated with the each of the accessed plurality of rules and wherein the visual indicator is indicative of whether the accessed rule is approved.

3. The method of claim 1, further comprising, using the server, generating fifth data representative of at least a fifth graphical user interface wherein the fifth graphical user interface is configured to visually present a visual indicator associated with the each of the accessed plurality of rules and wherein the visual indicator is indicative of whether the accessed rule is not approved.

4. The method of claim 1, further comprising, using the server, generating fifth data representative of at least a fifth graphical user interface wherein the fifth graphical user interface is configured to visually present visual indicators associated with each of the accessed plurality of rules and wherein the visual indicators are indicative of at least one of the first set of states and the second set of states.

5. The method of claim 1, wherein the at least one of a plurality of stakeholders has an email address and using the server to send one or more notifications to the at least one of the plurality of stakeholders is sent to the email address.

6. The method of claim 1, further wherein data in at least some of the plurality of rows is presented in a form of a drop down menu with data pre-populated from said memory.

* * * * *